US005506487A

United States Patent [19]
Young et al.

[11] Patent Number: 5,506,487
[45] Date of Patent: Apr. 9, 1996

[54] SYSTEMS AND METHODS FOR DRIVING A COMPRESSOR WITH A MOTOR

[75] Inventors: Glen C. Young, Fort Wayne; Mark L. Schmidt, Huntington, both of Ind.

[73] Assignee: General Electric Company, Fort Wayne, Ind.

[21] Appl. No.: 283,734

[22] Filed: Aug. 1, 1994

Related U.S. Application Data

[63] Continuation-in-part of Ser. No. 108,328, Aug. 18, 1993, Pat. No. 5,423,192, and a continuation-in-part of Ser. No. 219,022, Mar. 28, 1991, which is a continuation-in-part of Ser. No. 108,328.

[51] Int. Cl.$^6$ ........................................ H02P 5/40
[52] U.S. Cl. .................... 318/811; 318/254; 318/802; 318/805
[58] Field of Search .................... 318/138, 254, 318/700–832; 388/900–932; 62/209, 228.1, 226, 215, 208, 228.4, 6

[56] References Cited

U.S. PATENT DOCUMENTS

| | | | |
|---|---|---|---|
| 4,015,182 | 3/1977 | Erdman | 318/334 |
| 4,250,544 | 2/1981 | Alley | 364/110 |
| 4,291,265 | 9/1981 | Kawada et al. | 318/782 |
| 4,314,191 | 2/1982 | Kawada et al. | 318/802 |
| 4,346,434 | 8/1982 | Morinaga | 364/183 |
| 4,390,826 | 6/1983 | Erdman et al. | 318/439 |
| 4,408,299 | 10/1983 | Young | 364/900 |
| 4,415,844 | 11/1983 | Mendenhall et al. | 318/254 |
| 4,459,519 | 7/1984 | Erdman | 318/254 |
| 4,495,450 | 1/1985 | Tokizaki et al. | 318/138 |
| 4,500,821 | 2/1985 | Bitting et al. | 318/254 |
| 4,540,921 | 9/1985 | Boyd, Jr. et al. | 318/254 |
| 4,595,865 | 6/1986 | Jahns | 318/254 |
| 4,636,936 | 1/1987 | Boyd, Jr. et al. | 364/148 |
| 4,638,643 | 1/1987 | Sakazume et al. | 318/436 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,649,331 | 3/1987 | Jahns | 318/798 |
| 4,653,285 | 3/1987 | Pohl | 62/126 |
| 4,667,480 | 5/1987 | Bessler | 62/180 |
| 4,669,040 | 5/1987 | Pettit et al. | 318/610 X |

(List continued on next page.)

FOREIGN PATENT DOCUMENTS

87/03433  4/1987  European Pat. Off. .

OTHER PUBLICATIONS

Soviet Patent Abstracts, S–X sections, week 8945, Dec. 20, 1989.

*Primary Examiner*—Paul Ip
*Attorney, Agent, or Firm*—Ralph E. Krisher, Jr.

[57] ABSTRACT

A system which drives a compressor of a refrigeration system. The system includes a motor having a stationary assembly and a rotatable assembly. The stationary assembly includes windings adapted to be energized in at least one preselected sequence. The rotatable assembly is in magnetic coupling relation to the stationary assembly and in driving relation to the compressor. The system further includes a circuit for sensing a back electromotive force (EMF) voltage in the windings and for generating a BEMF signal representative thereof. The BEMF signal has first and second polarities representative of position of the rotatable assembly relative to a zero crossing of the sensed back EMF voltage. The first polarity is representative of the position of the rotatable assembly past a position corresponding to the zero crossing and the second polarity is opposite the first polarity. A control circuit responsive to the BEMF signal generates a commutation signal and includes a commutation counter counting at a preset rate. The commutation counter increases its count when the BEMF signal is of the first polarity and decreases its count when the BEMF signal is of the second polarity. The control circuit further generates a corresponding commutation signal when the count reaches a preset value. The system further includes power switching devices responsive to the commutation signal for selectively connecting a power supply to the windings in the preselected sequence to produce an electromagnetic field for rotating the rotatable assembly.

43 Claims, 13 Drawing Sheets

U.S. PATENT DOCUMENTS

| | | | |
|---|---|---|---|
| 4,669,405 | 6/1987 | Resta et al. | 112/121.14 |
| 4,688,547 | 8/1987 | Ballard et al. | 126/116 A |
| 4,712,050 | 12/1987 | Nagasawa et al. | 318/254 |
| 4,722,018 | 1/1988 | Pohl | 361/22 |
| 4,736,143 | 4/1988 | Nakamura et al. | 318/432 |
| 4,743,815 | 5/1988 | Gee et al. | 318/254 |
| 4,752,724 | 6/1988 | Radziwill et al. | 318/254 |
| 4,754,405 | 6/1988 | Foster | 364/557 |
| 4,757,241 | 7/1988 | Young | 318/254 |
| 4,806,839 | 2/1989 | Nagato et al. | 318/798 |
| 4,860,186 | 8/1989 | Maekawa et al. | 363/41 |
| 4,860,231 | 8/1989 | Ballard et al. | 364/571 |
| 4,862,052 | 8/1989 | Unsworth et al. | 318/757 |
| 4,868,467 | 9/1989 | Davis | 318/254 |
| 4,876,491 | 10/1989 | Squires et al. | 318/138 |
| 4,879,502 | 11/1989 | Endo et al. | 318/723 |
| 4,896,089 | 1/1990 | Kliman et al. | 318/701 |
| 4,902,952 | 2/1990 | Lavery | 318/645 |
| 4,916,370 | 4/1990 | Rowan et al. | 318/368 |
| 4,950,918 | 8/1990 | O'Breartuin et al. | 307/242 |
| 4,952,853 | 8/1990 | Archer | 318/254 |
| 4,958,269 | 9/1990 | Gritter | 364/153 |
| 4,959,596 | 9/1990 | MacMinn et al. | 318/254 |
| 4,978,897 | 12/1990 | Merrison et al. | 318/268 |
| 4,992,715 | 2/1991 | Nakamura et al. | 318/649 |
| 4,996,470 | 2/1991 | Rowan et al. | 318/772 |
| 5,003,241 | 3/1991 | Rowan et al. | 318/761 |
| 5,045,988 | 9/1991 | Gritter et al. | 363/35 |
| 5,107,685 | 4/1992 | Kobayashi | 62/115 |
| 5,119,071 | 6/1992 | Takezawa et al. | 318/130 |
| 5,151,642 | 9/1992 | Lombardi et al. | 318/779 |
| 5,170,344 | 12/1992 | Berton et al. | 364/400 |
| 5,187,419 | 2/1993 | DeLange | 318/805 |
| 5,202,951 | 4/1993 | Doyle | 388/811 |
| 5,221,881 | 6/1993 | Cameron | 318/254 |
| 5,233,275 | 8/1993 | Danino | 318/254 |
| 5,254,926 | 10/1993 | Miller et al. | 318/798 |
| 5,259,211 | 11/1993 | Ikeda | 62/228.4 |
| 5,282,723 | 2/1994 | Bellomo | 417/45 |
| 5,285,029 | 2/1994 | Araki | 187/114 |
| 5,287,045 | 2/1994 | Uehara | 318/268 |
| 5,345,156 | 9/1994 | Moreira | 318/254 |
| 5,384,527 | 1/1995 | Rozman et al. | 322/10 |

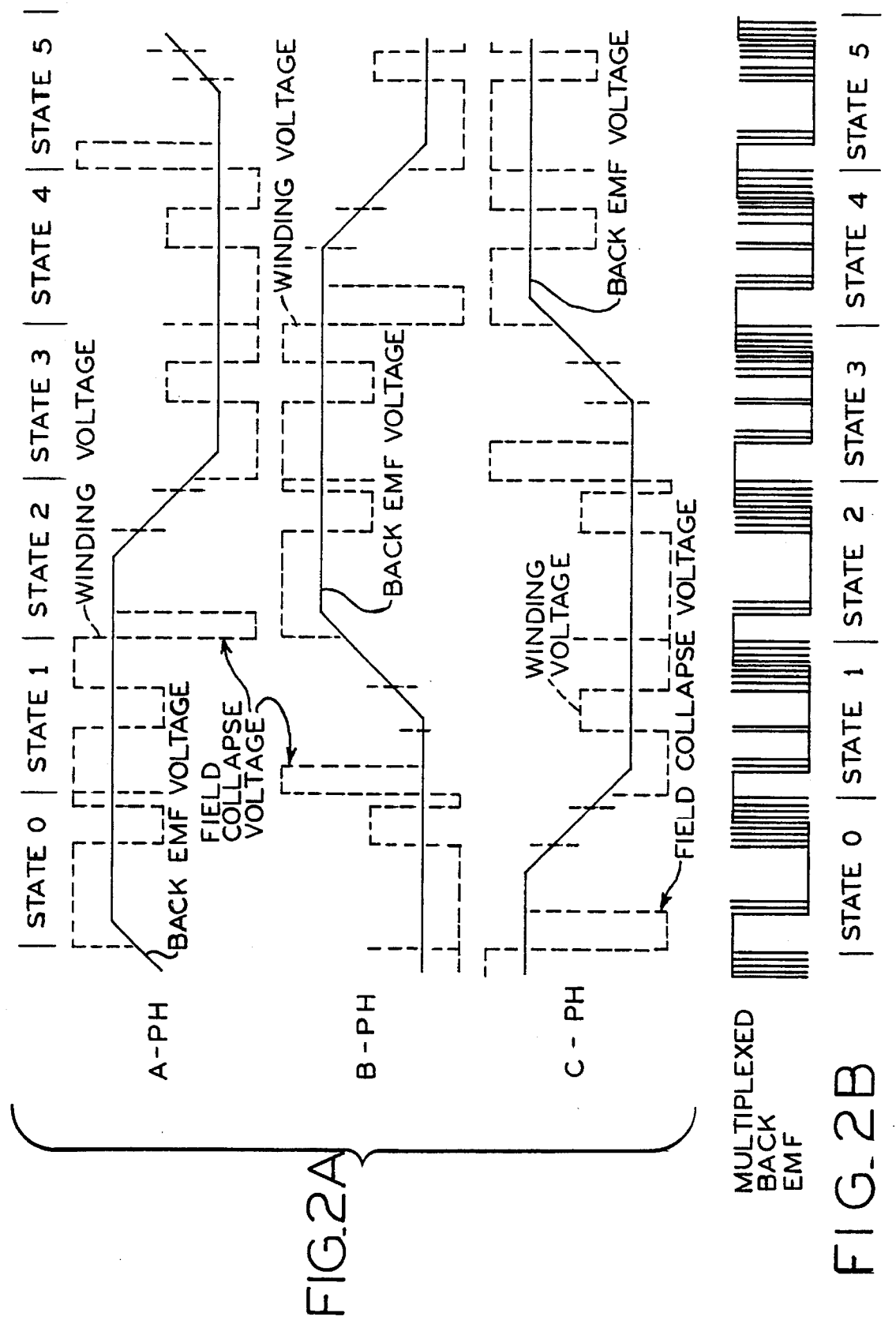

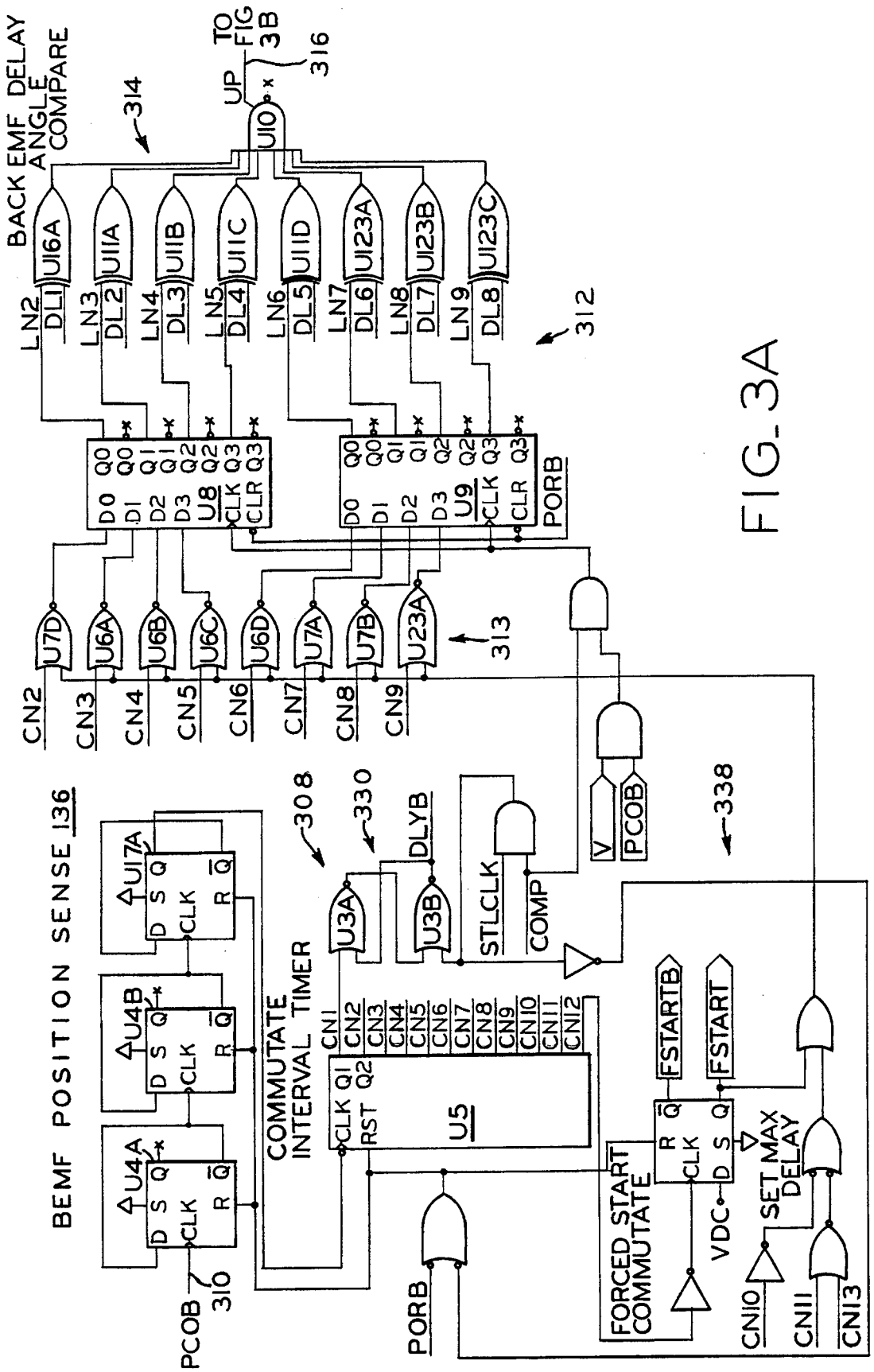
FIG._3A

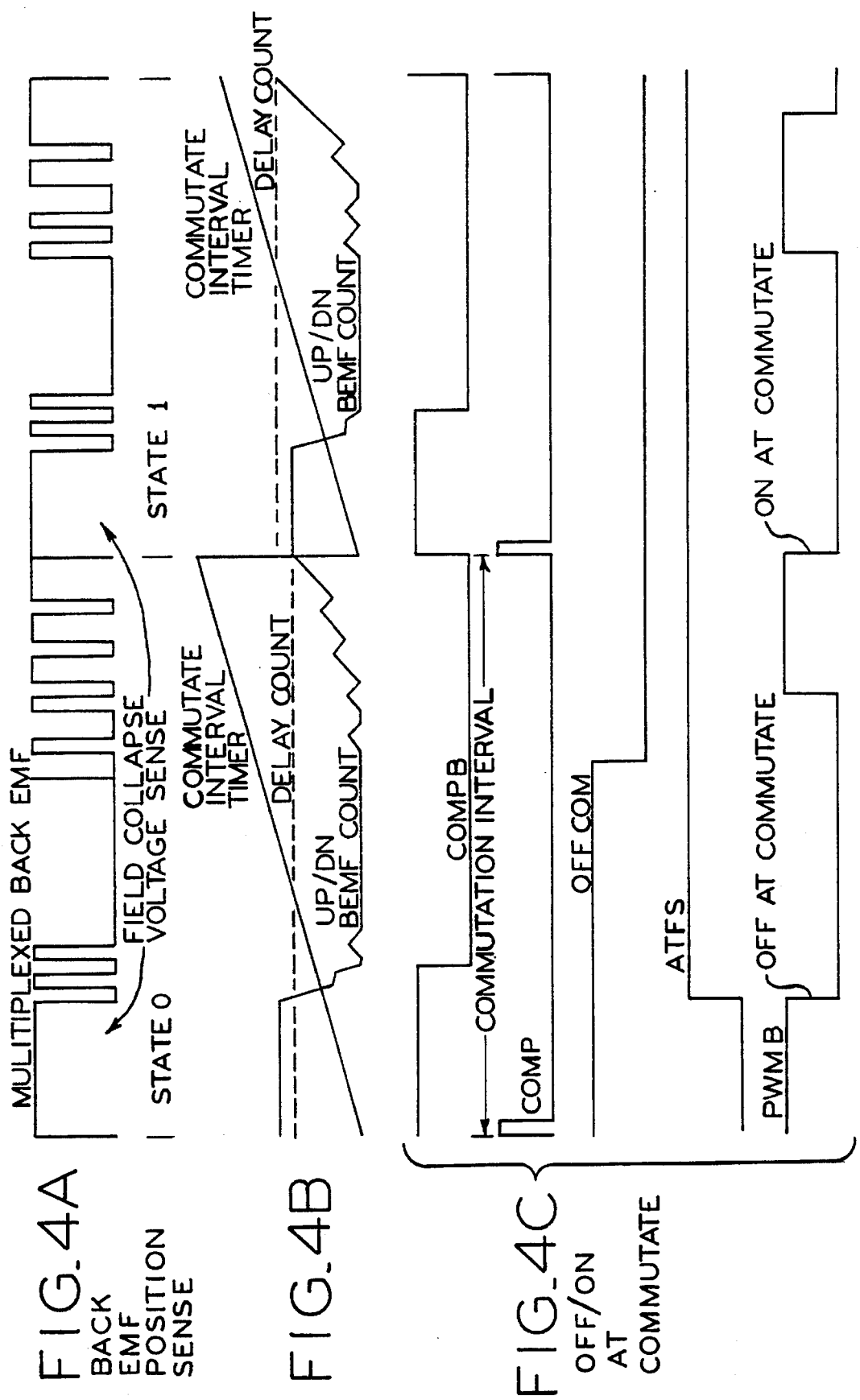

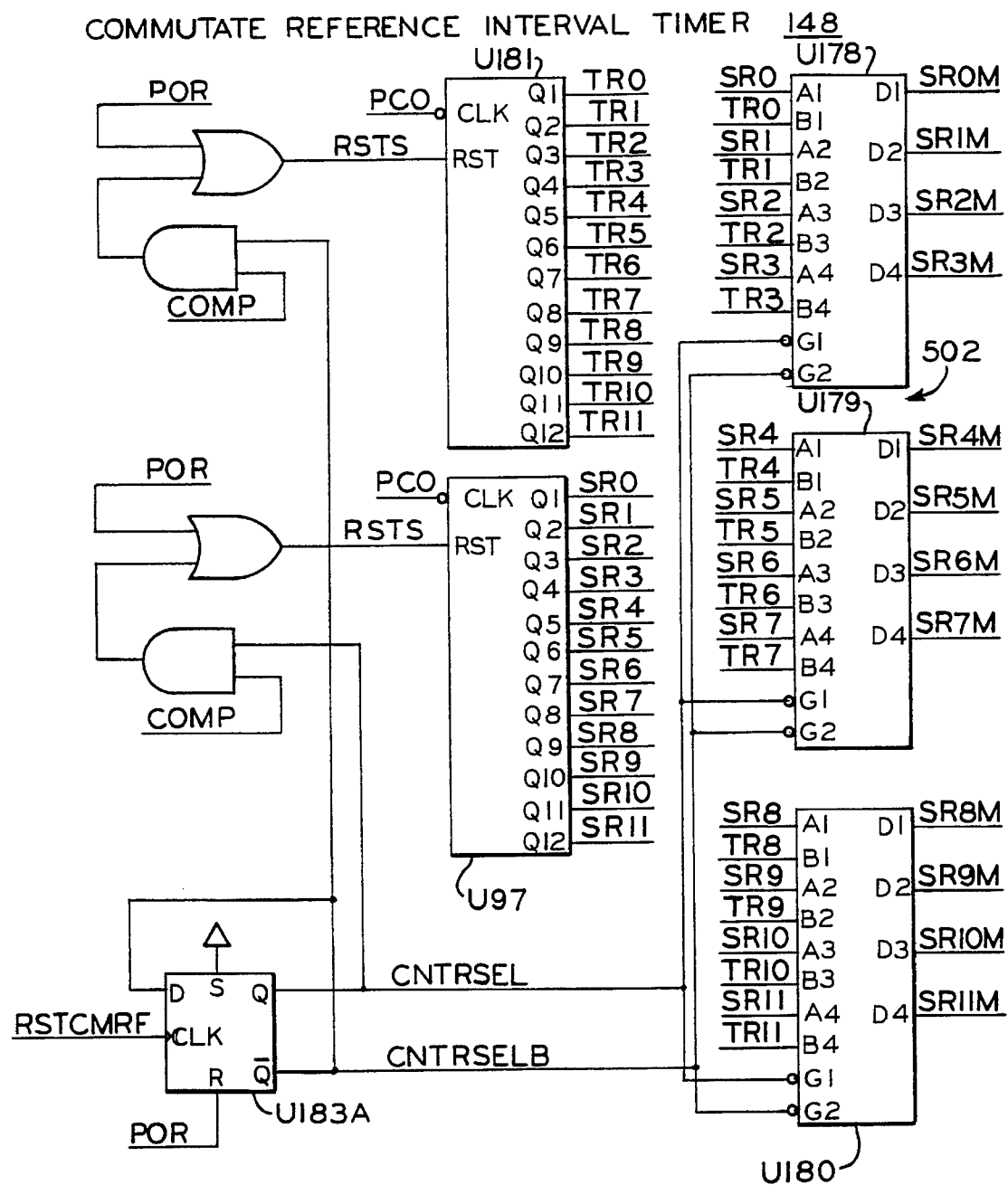
FIG_5A

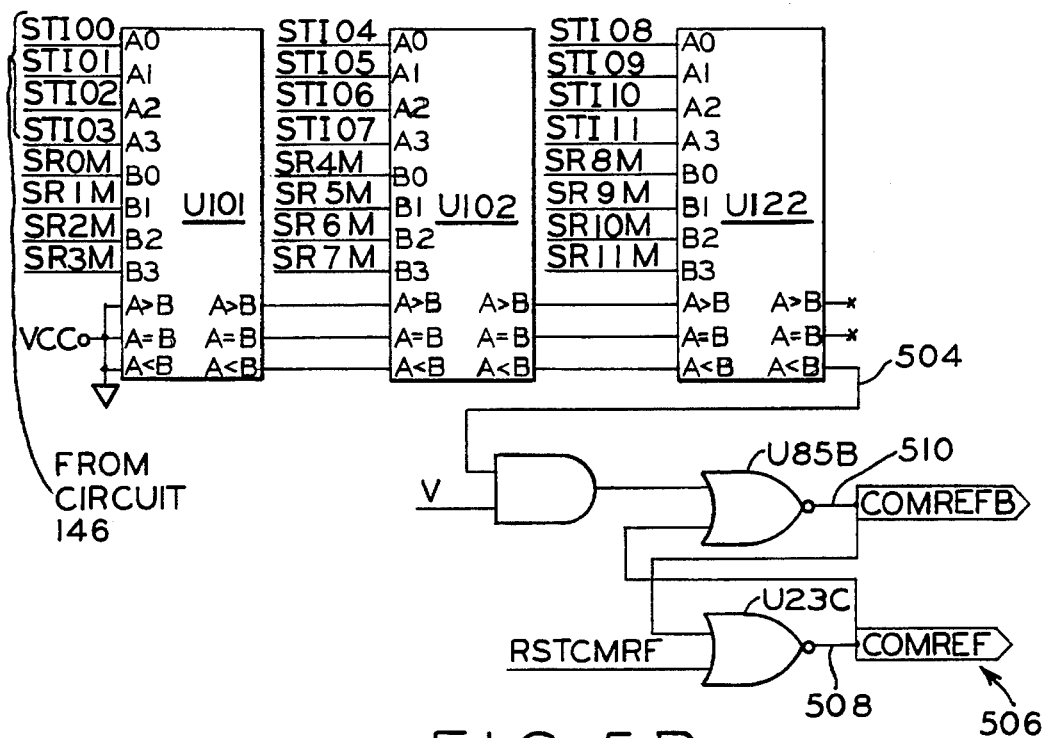
FIG_5B
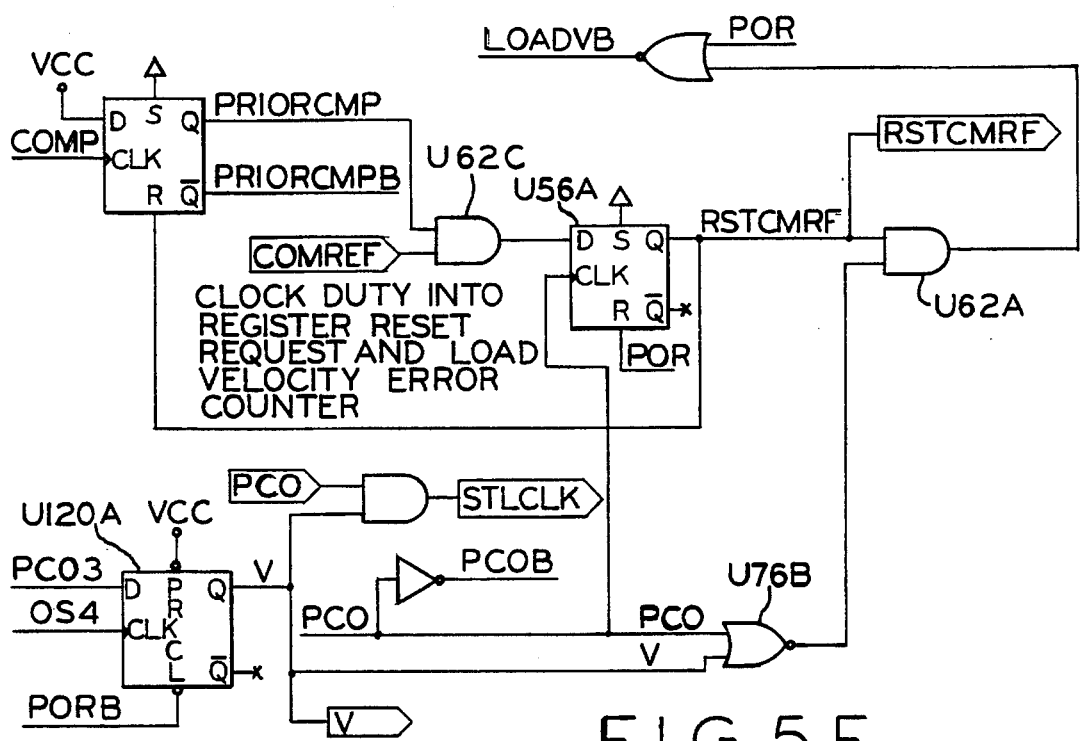
FIG_5E

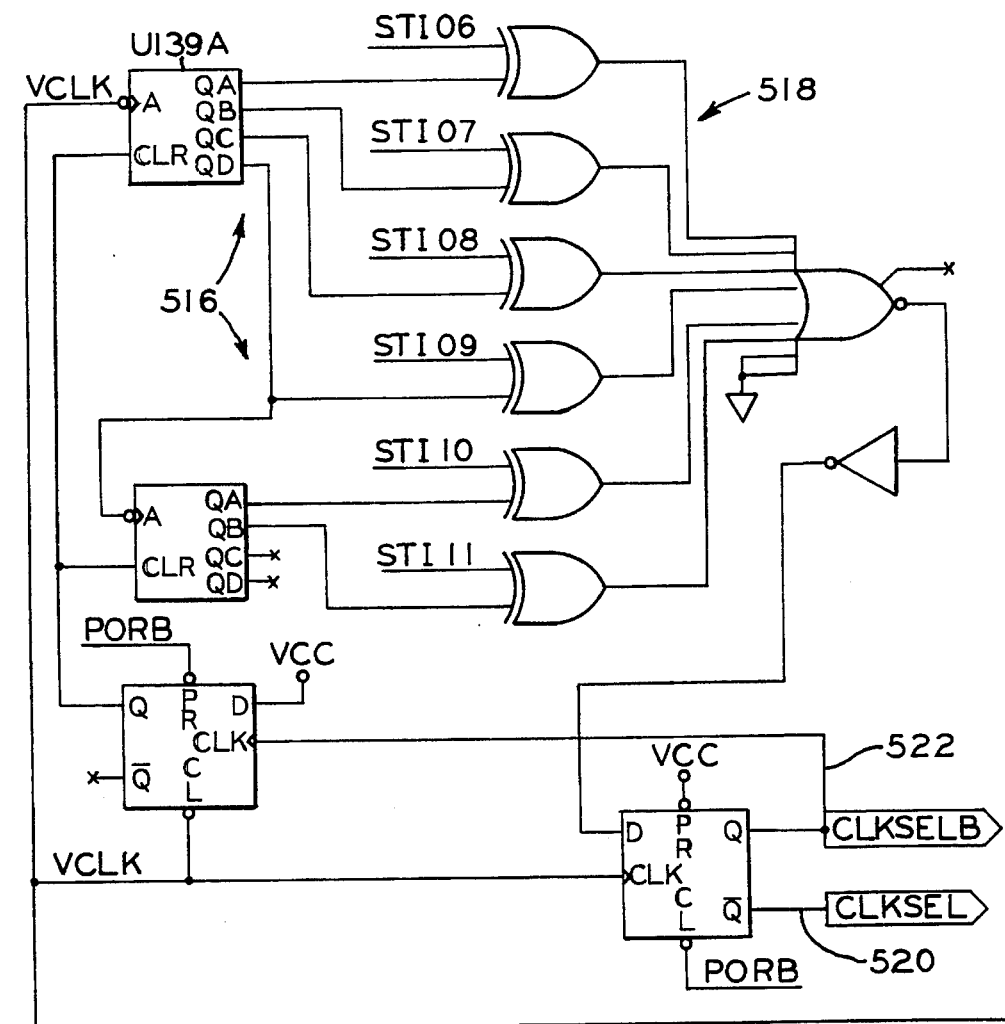
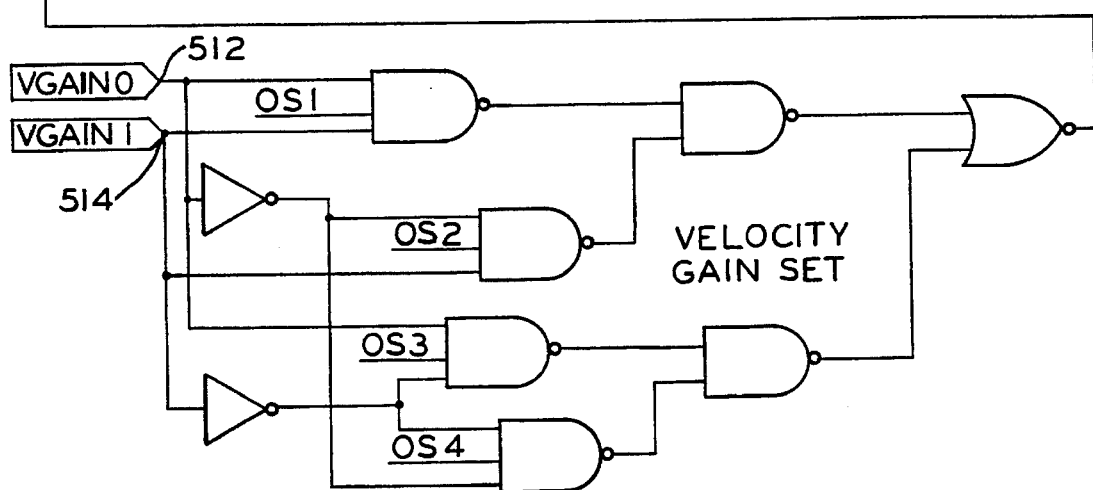
FIG_5C

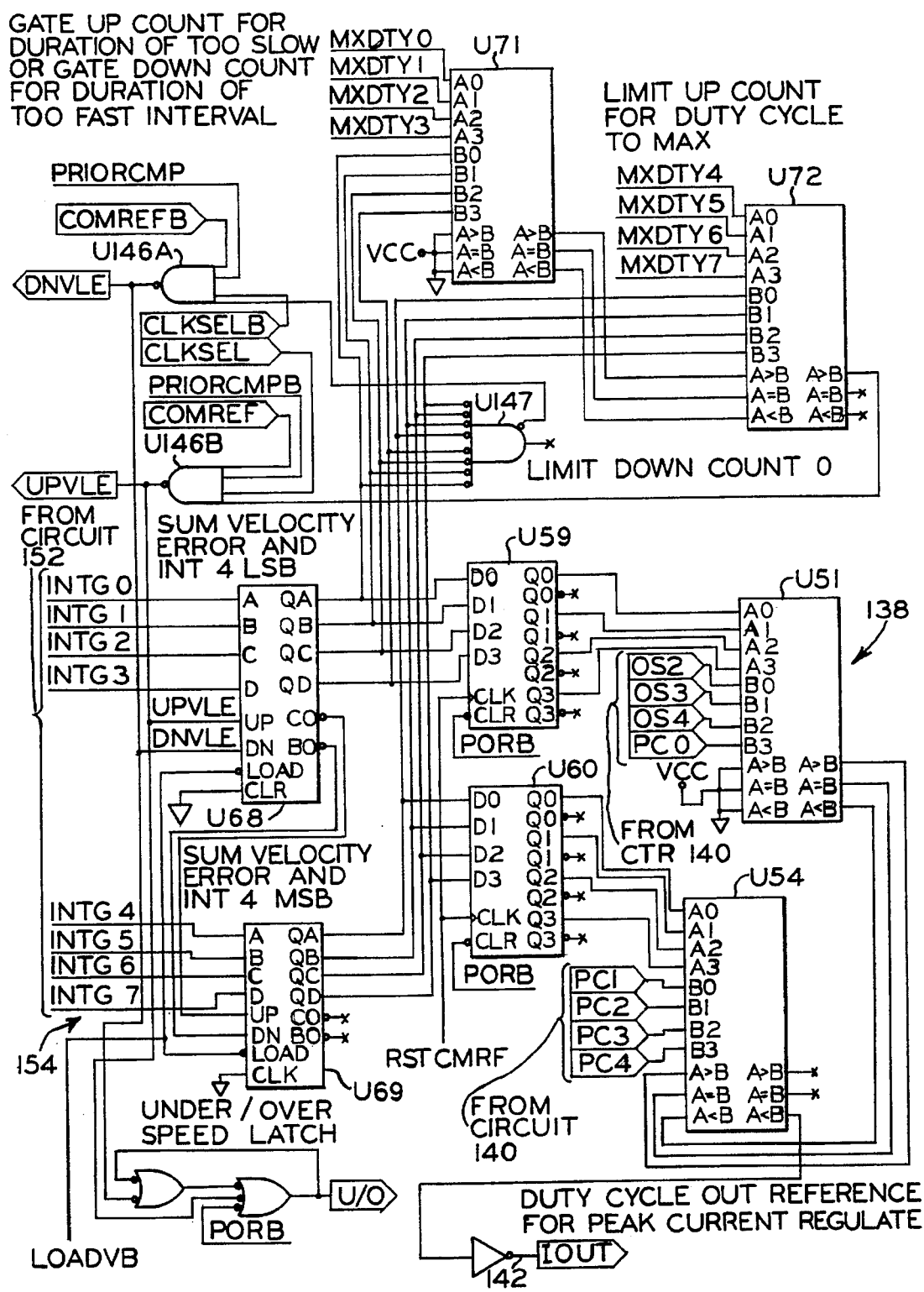
FIG_5D

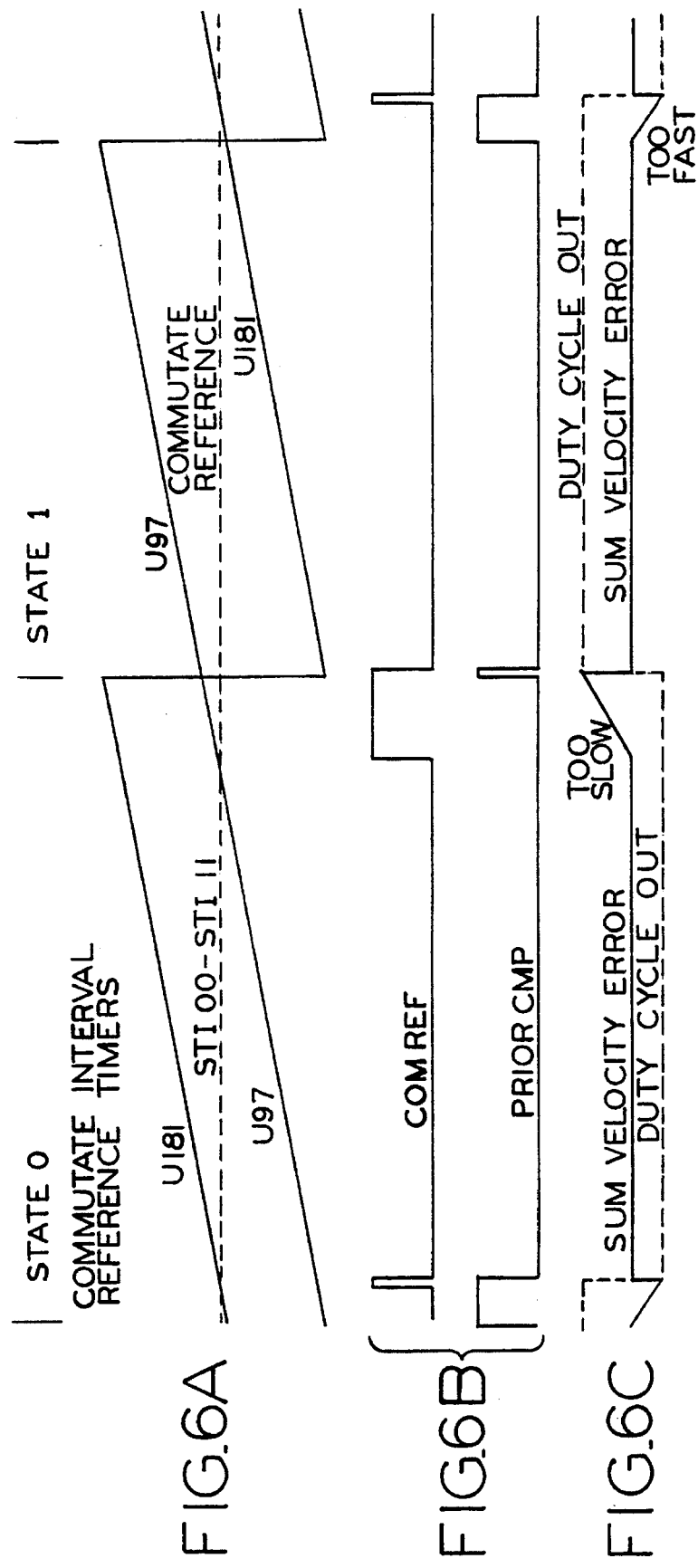

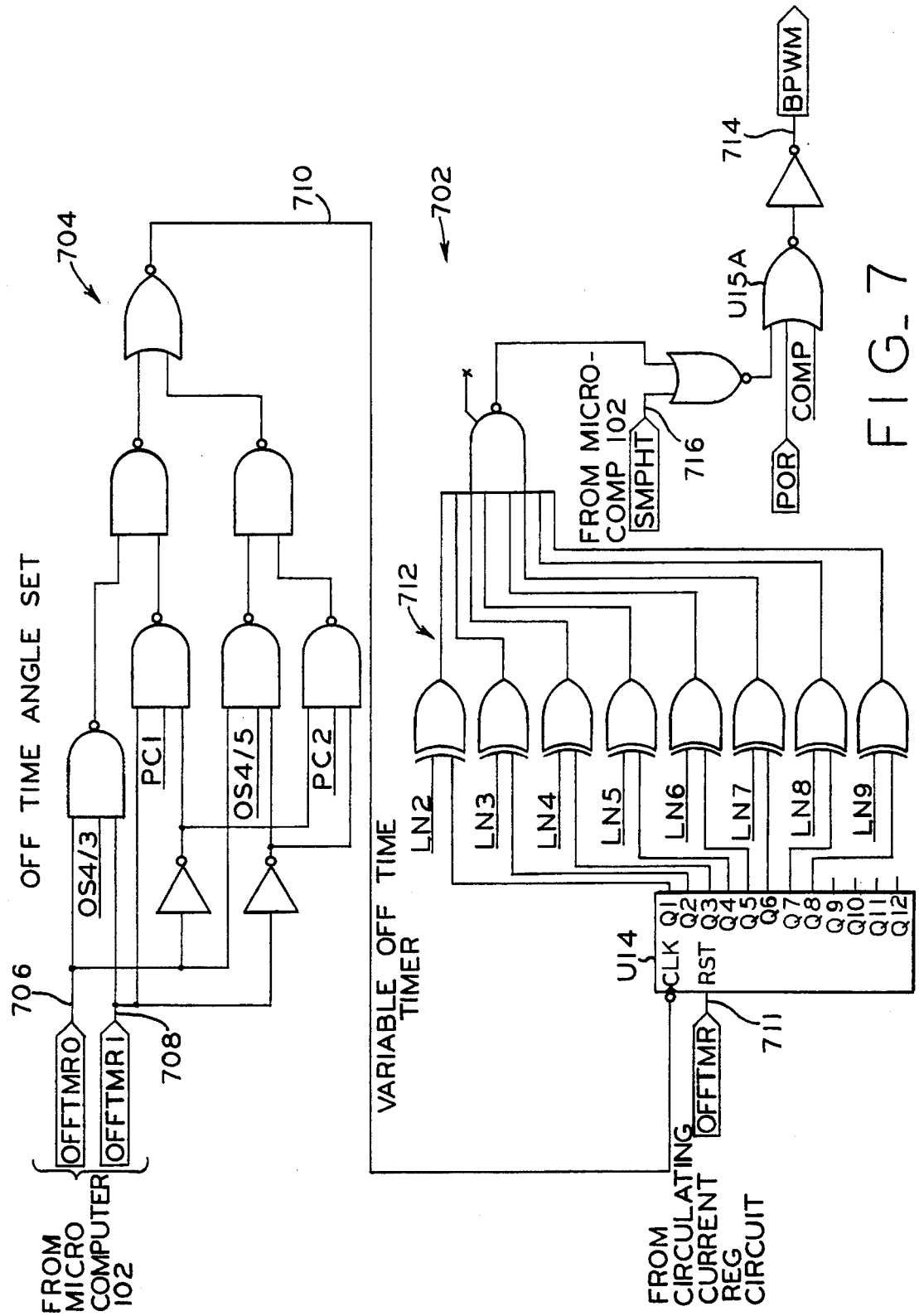
FIG_7

SYSTEMS AND METHODS FOR DRIVING A COMPRESSOR WITH A MOTOR

CROSS-REFERENCE TO RELATED APPLICATIONS

This application is a continuation-in-part of U.S. patent application Ser. No. 08/219,022, filed Mar. 28, 1994 (pending), and U.S. patent application Ser. No. 08/108,328, filed Aug. 18, 1993, now U.S. Pat. No. 5,423,192, both of which are commonly assigned with the present application. Application Ser. No. 08/219,022 is a continuation-in-part of application Ser. No. 08/108,328. The entire disclosures of both of these applications, Ser. No. 08/219,022 and 08/108,328, are incorporated herein by reference in their entirety.

BACKGROUND OF THE INVENTION

This invention generally relates to any controllable motor and to systems, such as refrigeration systems, having motors therein for driving compressors.

Original equipment manufacturers of refrigeration systems and the like require motors for driving compressors or other rotatable components. Often, variable speed motors, including electronically commutated motors, are too costly for application in typical refrigeration systems. Manufacturers require motors that are as low cost as possible yet still perform as desired. As an example, presently available motors incorporate integration of the back electromotive force (EMF) voltage in the windings to provide robust and flexible rotor position sensing. However, such motors employ a costly transconductance amplifier or similar circuit resulting in greater cost for compressor drive systems.

The control circuits for these electronically controlled motors support various applications through the use of circuitry external to an application specific or universal control circuit. External support, though, increases the parts count as well as the size of the motors which also results in greater cost. For example, the cost of a conventional motor driving a compressor has an additional cost associated with an external sump heater. Since liquids are generally incompressible, damage can result to the compressor if liquid refrigerant is present in the intake to the compressor when the motor is started. The liquid refrigerant must first be converted to a gas. Again, including a separate heater for vaporizing the refrigerant at cold starts increases the cost of the motor.

Also, in a typical motor, current sensors are required in all phases to determine the currents flowing in the motor. However, this feature increases the cost of the motor. On the other hand, a motor employing only a single current sensing element is generally unable to detect circulating currents. As disclosed in commonly assigned application Ser. No. 08/219,022, the entire disclosure of which is incorporated herein by reference, circulating currents cannot be observed in a shunt resistor (or other current sensor) located in the power supply link connecting the motor to a power supply. For this reason, a motor providing detection of circulating currents with a single sensing element is desired.

A further shortcoming of a shunt resistor (or other current sensor) located in the power supply link is the inability to limit current in all three windings at commutation to a desired regulate value. At commutation, the current of two windings (one just turned off and one just turned on) must sum in the third winding of a three-phase motor. At low speed, these currents can sum to a value greater than that observed in the shunt resistor. Therefore, for motors with low ability to withstand demagnetization, some increased risk of motor demagnetization will result. As is known in the art, inductive current in the windings produces a field collapse voltage in the windings of a motor in advance of back EMF. There is a need for a motor employing this field collapse voltage to provide the necessary timing information for the initiation of conduction and the avoidance of current being developed in the third winding above the desired regulate value.

Another shortcoming of presently available motors is that an original equipment manufacturer may have difficulty adapting a conventional motor to a number of different applications requiring a wide range of speeds. In a motor using digital speed error counting for speed regulation, the rate of counting may be suitable at high motor speeds but cause unstable operation at low speeds. Conversely, if the count rate provides stable operation at low speeds, the motor may have insufficient capability to modulate torque at high speeds.

With respect to regulation of the current in the motor's windings, every motor does not respond in the same manner to having its current turned off for a particular angle of off time. Therefore, there is a need to improve motor performance by selecting an angle for current variable off time particular to the motor's application.

Also, microcomputers used in controlling motors have a propensity to "lock up" in the illegal execution of code due to the interruption of sustained serial communication caused by a high noise environment. Therefore, there is a need to employ a "watch dog" which responds to such a lock up by resetting the microcomputer to a state where correct operation can resume.

Motors, such as electronically commutated motors, are disclosed in U.S. Pat. Nos. 4,642,537, 4,757,241 and 4,806,833 and application Ser. No. 07/889,708, filed May 27, 1992, all of which are commonly assigned with the present application and the entire disclosures of which are incorporated herein by reference in their entirety.

SUMMARY OF THE INVENTION

Among the several objects of this invention may be noted the provision of an electronically controlled motor for driving a compressor which permits calculating a commutation sequence for energizing its windings by digital up/down counting in partial emulation of rotor position sensing by back electromotive force (EMF) volt*second integration; the provision of such a motor which permits inhibiting commutation of the windings prior to the substantial decay of field collapse voltage for operation of the motor below ½ no load speed; the provision of such a motor which permits compressor sump heating by forcing a high frequency commutation of the motor; the provision of such a motor which permits selecting "gain" for speed regulation by up/down digital speed error counting at a predetermined rate which is a function of a requested time in an overspeed or underspeed condition; the provision of such a motor which permits selecting an angle of off time for turning off current in the windings for current regulation; the provision of such a motor which permits microcomputer reset based on a serial communication "watch dog" circuit responsive to interrupted serial communication; and the provision of such a motor which is economically feasible and commercially practical.

Briefly described, a system embodying aspects of the present invention includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The system includes a circuit for sensing a back EMF voltage in the windings and for generating a signal, BEMF, representative of the sensed back EMF voltage. The BEMF signal has first and second polarities representative of position of the rotatable assembly relative to a zero crossing of the sensed back EMF voltage. The first polarity is representative of the position of the rotatable assembly past a position corresponding to the zero crossing and the second polarity is opposite the first polarity. A control circuit responsive to the BEMF signal generates a commutation signal and includes a commutation counter counting at a preset rate. The commutation counter increases its count when the BEMF signal is of the first polarity and decreases its count when the BEMF signal is of the second polarity. The control circuit generates a corresponding commutation signal when the count reaches a preset value. In response to the commutation signal, power switching devices selectively connect a power supply to the windings in the preselected sequence to produce an electromagnetic field for rotating the rotatable assembly.

In another form, the present invention is directed to a system including a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The system includes a circuit for sensing a back EMF voltage in the windings and for generating a signal, BEMF, representative of the sensed back EMF voltage. A control circuit generates a commutation signal in response to the BEMF signal. In response to the commutation signal, power switching devices selectively connect a power supply to the windings in the preselected sequence to produce an electromagnetic field for rotating the rotatable assembly. The control circuit includes a circuit for inhibiting switching events of the power switching devices in advance of the back EMF voltage during periods when a field collapse voltage caused by inductive current in the windings is present. Thus, initiation of switching events is delayed until a significant reduction of the field collapse voltage for operation of the motor below approximately ½ no load speed.

Alternatively, a system according to the present invention includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The system includes a circuit for sensing a back EMF voltage in the windings and for generating a signal, BEMF, representative of the sensed back EMF voltage. A control circuit generates a commutation signal in response to the BEMF signal. The commutation signal has a series of commutation pulses and the control circuit measures an interval between commutation pulses. In response to the commutation signal, power switching devices selectively connect a power supply to the windings in the preselected sequence to produce an electromagnetic field for rotating the rotatable assembly. A speed regulation circuit compares the measured interval to a reference interval corresponding to a desired motor speed. The speed regulation circuit generates a difference signal between the compared measured interval and the reference interval to define a speed error. A processor integrates the speed error and generates an integrated speed error signal in response thereto. A speed error pre-counter included in the microcomputer accumulates the speed error and the processor alters the integrated speed error signal when the speed error accumulates to a preset amount. The preset amount may be a function of motor speed or selected from a predefined set of values. The speed regulation circuit includes a speed regulation counter responsive to the integrated speed error signal and the difference signal for generating a peak current reference signal. In turn, the speed regulation circuit regulates current in the windings as a function of the peak current reference signal thereby regulating the speed of the motor.

In yet another form, a system embodying aspects of the present invention includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The system includes a circuit for sensing a back EMF voltage in the windings and for generating a BEMF signal representative of the sensed back EMF voltage. A control circuit generates a commutation signal in response to the BEMF signal. The commutation signal has a series of commutation pulses and the control circuit measures a commutation interval between consecutive commutation pulses. In response to the commutation signal, power switching devices selectively connect a power supply to the windings in the preselected sequence to produce an electromagnetic field for rotating the rotatable assembly. A current detector circuit senses current in each of the windings and a variable off time circuit discontinues for a predetermined period of time power being provided to each of the windings in which the current reaches a peak current reference level to regulate current in the motor. The predetermined period of time is selected from a predefined set of values as a function of the measured commutation interval for minimizing losses and for providing smooth torque production.

The invention is also directed to a method of operating a system for driving a rotatable component. The system includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The method includes the steps of sensing a back EMF voltage in the windings and generating a signal, BEMF, representative of the sensed back EMF voltage. The BEMF signal has first and second polarities representative of position of the rotatable assembly relative to a zero crossing of the sensed back EMF voltage. The first polarity is representative of the position of the rotatable assembly past a position corresponding to the zero crossing and the second polarity is opposite the first polarity. The method includes the steps of generating a commutation signal in response to the BEMF signal and increasing a count of a commutation counter counting at a preset rate when the BEMF signal is of the first polarity and decreasing the count when the BEMF signal is of the second polarity. A corresponding commutation signal is then generated when the count reaches a preset value. In response to the commutation signal, power switching devices selectively connect a power supply to the windings in the preselected sequence to produce an electromagnetic field for rotating the rotatable assembly.

In another form, the invention is directed to a method of operating a system for driving a rotatable component. The system includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The method includes the steps of sensing a back EMF voltage in the windings, generating a signal, BEMF, representative of the sensed back EMF voltage and generating a commutation signal in response to the BEMF signal. In response to the commutation signal, power switching devices selectively connect a power supply to the windings in the preselected sequence to produce an electromagnetic field for rotating the rotatable assembly. The method further includes the step of inhibiting switching events of the power switching devices in advance of the back EMF voltage during periods when a field collapse voltage produced by inductive current in the winding commutated off for position sensing is present. In this manner, switching events during field collapse voltage are inhibited when the motor is operating below approximately ½ no load speed.

Alternatively, the invention is directed to a method of operating a system for driving a rotatable component. The system includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The method includes the steps of sensing a back EMF voltage in the windings, generating a signal, BEMF, representative of the sensed back EMF voltage and, in response to the BEMF signal, generating a commutation signal having a series of commutation pulses. In response to the commutation signal, power switching devices selectively connect a power supply to the windings in the preselected sequence to produce an electromagnetic field for rotating the rotatable assembly. The method further includes the steps of measuring an interval between commutation pulses and comparing the measured interval to a reference interval corresponding to a desired motor speed. A difference signal between the compared measured interval and the reference interval is generated to define a speed error. The method further includes the steps of integrating the speed error and generating an integrated speed error signal in response thereto. A microcomputer alters the integrated speed error signal when the speed error accumulates to a preset amount. The preset amount may be a function of the speed of the motor or selected from a predefined set of values. The method further includes the step of generating a peak current reference signal in response to the integrated speed error signal and the difference signal. In this manner, the current in the windings is regulated as a function of the peak current reference signal thereby regulating the speed of the motor.

In yet another form, a method according to the present invention operates a system for driving a rotatable component. The system includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The method includes the steps of sensing a back EMF voltage in the windings, generating a signal, BEMF, representative of the sensed back EMF voltage, generating a commutation signal having a series of commutation pulses in response to the BEMF signal and measuring a commutation interval between consecutive commutation pulses. In response to the commutation signal, power switching devices selectively connect a power supply to the windings in the preselected sequence to produce an electromagnetic field for rotating the rotatable assembly. The method further includes the steps of sensing current in each of the windings and discontinuing for a predetermined period of time power being provided to each of the windings in which the current reaches a peak current reference level to regulate current in the motor. The predetermined period of time is selected from a predefined set of values as a function of the measured commutation interval for minimizing losses and for providing smooth torque production.

Alternatively, the invention may comprise various other systems and methods.

Other objects and features will be in part apparent and in part pointed out hereinafter.

BRIEF DESCRIPTION OF THE DRAWINGS

FIG. 2 is a timing diagram illustrating the relationship between back electromotive force (EMF) voltage and winding voltage in the windings of the motor of FIG. 1.

FIGS. 3A–3C illustrate one preferred embodiment of a schematic diagram of a position sensing circuit and commutation delay circuit including a sump heat circuit and an off at commutate circuit of the ASIC of FIG. 1.

FIG. 4 is a timing diagram of one preferred commutation strategy relating to zero crossings, delays and off times as performed by the circuitry of FIGS. 3A–3C.

FIGS. 5A–5E illustrate one preferred embodiment of a schematic diagram of a speed regulation circuit of the ASIC of FIG. 1.

FIG. 6 is a timing diagram of one preferred speed regulation strategy as performed by the circuitry of FIGS. 5A–5E.

FIG. 7 is a schematic diagram of one preferred embodiment of a variable off time timer and off time angle selection circuit of the ASIC of FIG. 1.

Corresponding reference characters indicate corresponding parts throughout the drawings.

DETAILED DESCRIPTION OF PREFERRED EMBODIMENTS

Figure 1:
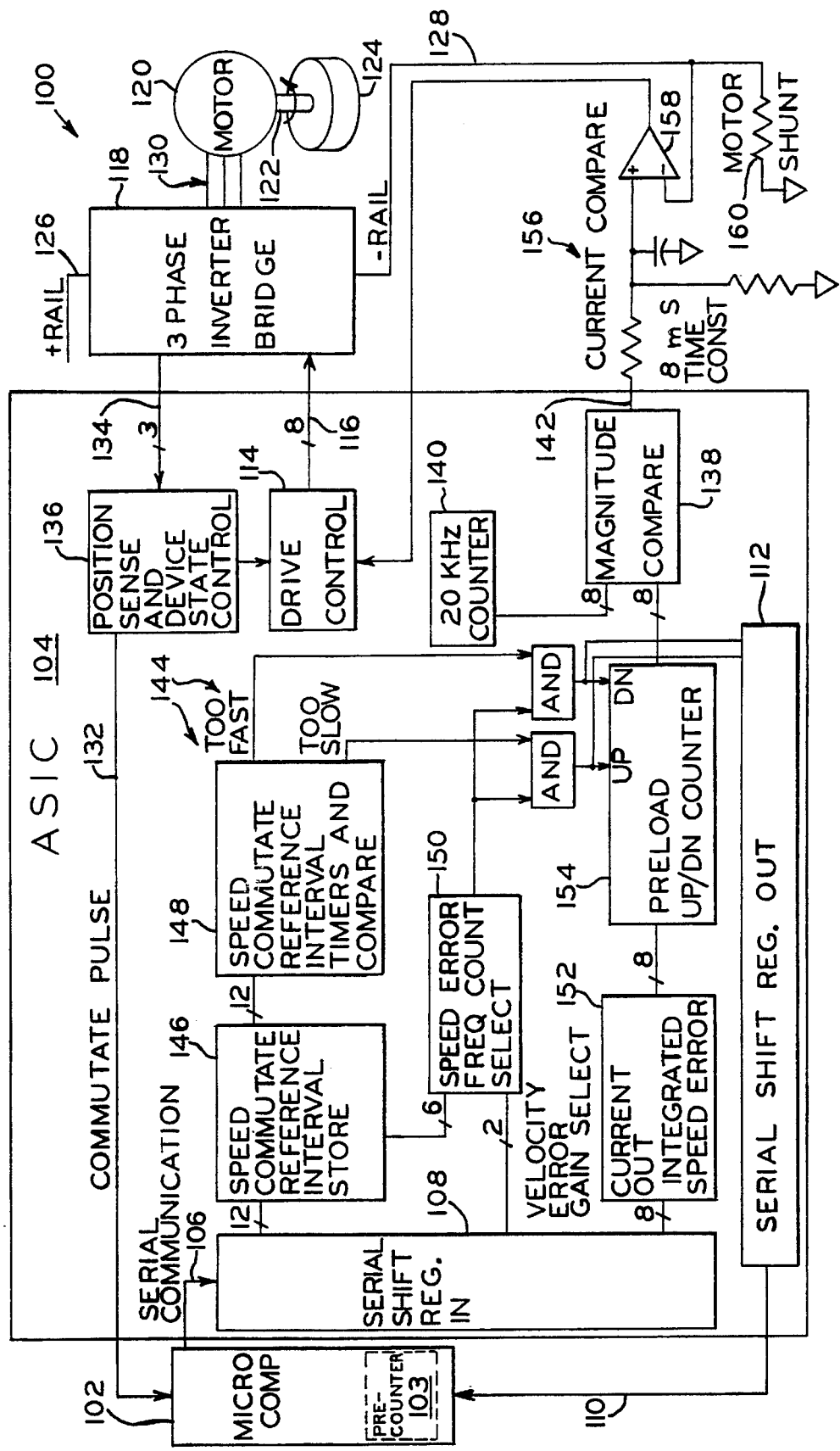
FIG. 1 is a block diagram of one preferred embodiment of a motor drive system according to the invention including an application specific integrated circuit (ASIC).

FIG. 1 shows a system 100 according to one preferred embodiment of the present invention. The system 100 includes a microcomputer 102 having a speed error precounter 103 in serial communication with an application specific integrated circuit (ASIC) 104. The microcomputer 102 provides a control signal and/or other signals to the ASIC 104 for controlling its operation. Similarly, ASIC 104 communicates various information to microcomputer 102. Specifically, microcomputer 102 communicates serially with bASIC 104 via line 106 connected to a serial "in" shift register 108 located in ASIC 104; ASIC 104 communicates serially with microcomputer 102 via line 110 connected to a serial "out" shift register 112 also located in ASIC 104.

A drive control circuit 114 in ASIC 104 provides gate drive signals for electronically controlling a plurality of gate drives (not shown). The gate drives, in turn, provide enough voltage via lines 116 to switch a plurality of power switching devices, preferably embodied as an inverter bridge 118. In this embodiment, the gate drives of the drive control circuit 114 provide voltage signals shifted from five volts to 15 volts for driving the power switches of the inverter bridge 118 and condition the signals provided from ASIC 104 for optimal operation of the power switches. By selective switching of its power switches, inverter bridge 118 controls rotation in any electronically controllable motor 120. Such motors include single or variable speed motors such as brushless DC motors including electronically commutated motors or switched reluctance motors.

The motor 120 of the present invention has a rotatable assembly, or rotor (not shown), in magnetic coupling relation to a stationary assembly, or stator (not shown). A shaft 122 mechanically connects the rotor to any rotatable component to be driven, such as a compressor 124 for circulating refrigerant through an evaporator (not shown) of a refrigeration system.

A power supply (not shown) provides power via a positive rail 126 (having a corresponding negative rail 128) to inverter bridge 118 for commutating the windings included in the stator of motor 120. According to the invention, drive control circuit 114 causes the power switches of inverter bridge 118 to selectively connect the windings to the positive and negative rails 126, 128 in at least one preselected sequence. In this embodiment, inverter bridge 118 selectively provides power via lines 130 to the windings of motor 120. The power supply also supplies power to operate ASIC 104 which drives inverter bridge 118 by drive control circuit 114.

ASIC 104 controls commutation of the windings of motor 120 by generating a commutation signal via line 132. Preferably, the commutation signal includes a series of commutation pulses wherein each pulse causes a corresponding switching event of the power switches of inverter bridge 118. The windings are adapted to be commutated in at least one preselected sequence and inverter bridge 118 selectively provides power to the windings of motor 120 in the preselected sequence. The resulting current flow in the windings produces an electromagnetic field for rotating the rotor of motor 120. By controlling the current in the windings, ASIC 104 controls the speed of motor 120 which in turn controls the speed of compressor 124.

In the embodiment illustrated in FIG. 1, motor 120 is a three-phase motor and inverter bridge 118 energizes two of the three windings at any given time during operation to develop torque. A preferred commutation scheme for motor 120 involves three-phase excitation with 120 electrical degree conduction. ASIC 104 commands inverter bridge 118 so that two of its switches are conducting during each motoring interval, one from an upper set of switches and one from a lower set of switches. Current flows in only two of the three phases of motor 120 during each commutation interval. Drive control circuit 114 provides pulse width modulation (PWM) control of the power to the windings by turning on and off one of the two conducting power switches. As described below, ASIC 104 selects which of the upper switches or lower switches is to be used for pulse width modulating the power applied to the windings of motor 120 at a given time.

As is known in the art, the angular position of the rotor of motor 120 is related to the back electromotive force (EMF) voltage in the windings and, particularly, to its zero crossings. According to the invention, ASIC 104 selects the unenergized winding for position sensing by observing the motor phase back EMF waveforms when current in the selected phase has decayed to zero. ASIC 104 receives signals, AS, BS and CS, from inverter bridge 118 via lines 134 which represent the back EMF voltage in the windings of motor 120. These signals also provide information of zero crossings of the difference between the back EMF voltage of a selected winding of motor 120 as compared to a reference level. The reference level is, for example, the sum of the voltages of the energized windings. In a preferred embodiment, each of the commutation pulses of the commutation signal corresponds to a zero crossing and occurs a predetermined period of time or a predetermined delay angle, after the corresponding zero crossing.

A position sensing circuit 136 (shown in more detail in FIGS. 3A–3C) in ASIC 104 senses the position of the rotor as a function of back EMF voltages in the windings and generates a commutation signal for controlling the state of inverter bridge 118 as a function of rotor position. The position sensing circuit 136 includes a multiplexer circuit (shown in FIG. 3C) which provides a signal, BEMF, representative of the back EMF voltage in the windings. In this embodiment, the BEMF signal is a multiplexed representation of the sensed back EMF voltages. FIG. 2 illustrates an exemplary timing diagram of various signals sensed or generated by position sensing circuit 136. FIG. 2(a) shows a representation of the back EMF voltages for phases A, B and C of motor 120. FIG. 2(a) also shows exemplary winding voltages, including field collapse voltages, for each of the windings. Inductive current in the selected winding produces the field collapse voltage in advance of the back EMF. As described above, ASIC 104 uses the multiplexer circuit to multiplex the back EMF signals and to compare the signal to a reference level input signal for generating BEMF. FIG. 2(b) illustrates multiplexed back EMF output of multiplexer circuit, i.e., the signal, BEMF.

Referring again to FIG. 1, ASIC 104 determines the position of the rotor of motor 120 as a function of BEMF and position sensing circuit 136 generates commutation signals in response thereto. Position sensing circuit 136 cooperates with drive control circuit 114 and, thus, inverter bridge 118, to cause the windings of motor 120 to be selectively energized in the preselected sequence. Torque production in a phase of motor 120 is determined by the product of the current in the phase and the back EMF voltage of the phase. Therefore, to sustain positive torque, it is preferable to energize a winding of motor 120 when the back EMF has crossed zero in the direction that will oppose the voltage energizing the winding. At low speeds, for example, it is convenient to energize a winding of motor 120 when it is experiencing maximum rotor flux.

ASIC 104 generates the commutation signal in response to a peak current reference signal, IOUT, which commands system 100 to produce a peak current matching the load torque demand. In the illustrated embodiment, a magnitude comparator circuit 138 clocked by a 20 kHz counter 140 develops the peak current reference and outputs the IOUT signal via line 142. System 100 regulates motor speed by regulating current in the windings of motor 120 as a function of IOUT and achieves the desired speed of motor 120 by matching the load torque with the produced torque at the desired speed. By controlling the power delivered to its load, system 100 controls the speed of motor 120 which in turn controls the speed of compressor 124.

As shown in FIG. 1, ASIC 104 includes a speed regulation circuit 144 (shown in more detail in FIGS. 5A–5E). The speed regulation circuit 144 comprises a circuit 146 for storing a commutation reference interval and a time and compare circuit 148 for timing the commutation interval and comparing it to the stored commutation reference interval. Speed regulation circuit 144 further comprises a frequency selection circuit 150 for selecting a frequency at which speed errors are counted. An integrated speed circuit 152 provides an estimated correction for the integrated speed error from microcomputer 102 via line 106 and shift register 108. The estimated integrated speed error correction is based on the number of commutation intervals corresponding to either an overspeed or an underspeed condition.

A preload up/down counter 154 included in speed regulation circuit 144 corrects the integrated speed error based on the immediately prior commutation interval so as to prevent undershoot or overshoot when regulating the speed of motor 120. As will be described in detail below, speed regulation circuit 144 of ASIC 104 cooperates with microcomputer 102 for regulating the speed of motor 120. Further, speed regulation circuit 144 cooperates with the magnitude comparator circuit 138 for generating the peak current signal, IOUT, and for regulating peak current in windings of motor 120 as a function of IOUT.

An RC circuit 156 having an eight millisecond time constant averages the IOUT signal to convert it from a digital to an analog signal. This digital-to-analog conversion produces a reference voltage at a current comparator 158. The current comparator 158 compares the reference voltage, i.e., the analog of IOUT, to a measured voltage corresponding to current in a shunt resistor 160 located in negative rail 128. According to the invention, system 100 regulates current in the windings of motor 120 by turning off power to each of the windings when the current exceeds the regulate value for a predetermined amount of time based on the interval between zero crossings.

Accurate speed regulation facilitates operating motor 120 at the lowest possible speed without risk of operation below the minimum oiling speed. For this reason, ASIC 104 of the present invention is predominantly digital in operation with a crystal oscillator (not shown) for determining its timed functions. Speed regulation circuit 144 will be described in detail below.

In regard to another aspect of regulating current in the windings of motor 120, inverter bridge 118 preferably includes a plurality flyback diodes (not shown), each corresponding to one power switch. As described above, ASIC 104 commands two of three windings of motor 120 to be energized at a time and pulse width modulates the power being applied to the energized windings for control purposes. Drive control circuit 114 provides PWM control of the power to the windings by turning on and off one of the power switches. By doing so, the PWM control scheme of system 100 causes a flyback current to circulate when only one power switch and one flyback diode are conducting.

Coassigned U.S. patent application Ser. No. 08/219,022, the entire disclosure of which is incorporated herein by reference in its entirety, describes a circuit for sensing current in a power supply link connecting the power switches to the power supply. This circuit cooperates with a circuit resident in ASIC 104 for regulating current in system 100. Particularly, these circuits regulate circulating currents in inverter bridge 118 during periods when only one power switch is conducting. In a preferred embodiment of the present invention, the circulating current regulation circuit shown in FIG. 4 of application Ser. No. 08/219,022 is included in drive control circuit 114.

Figure 3B:
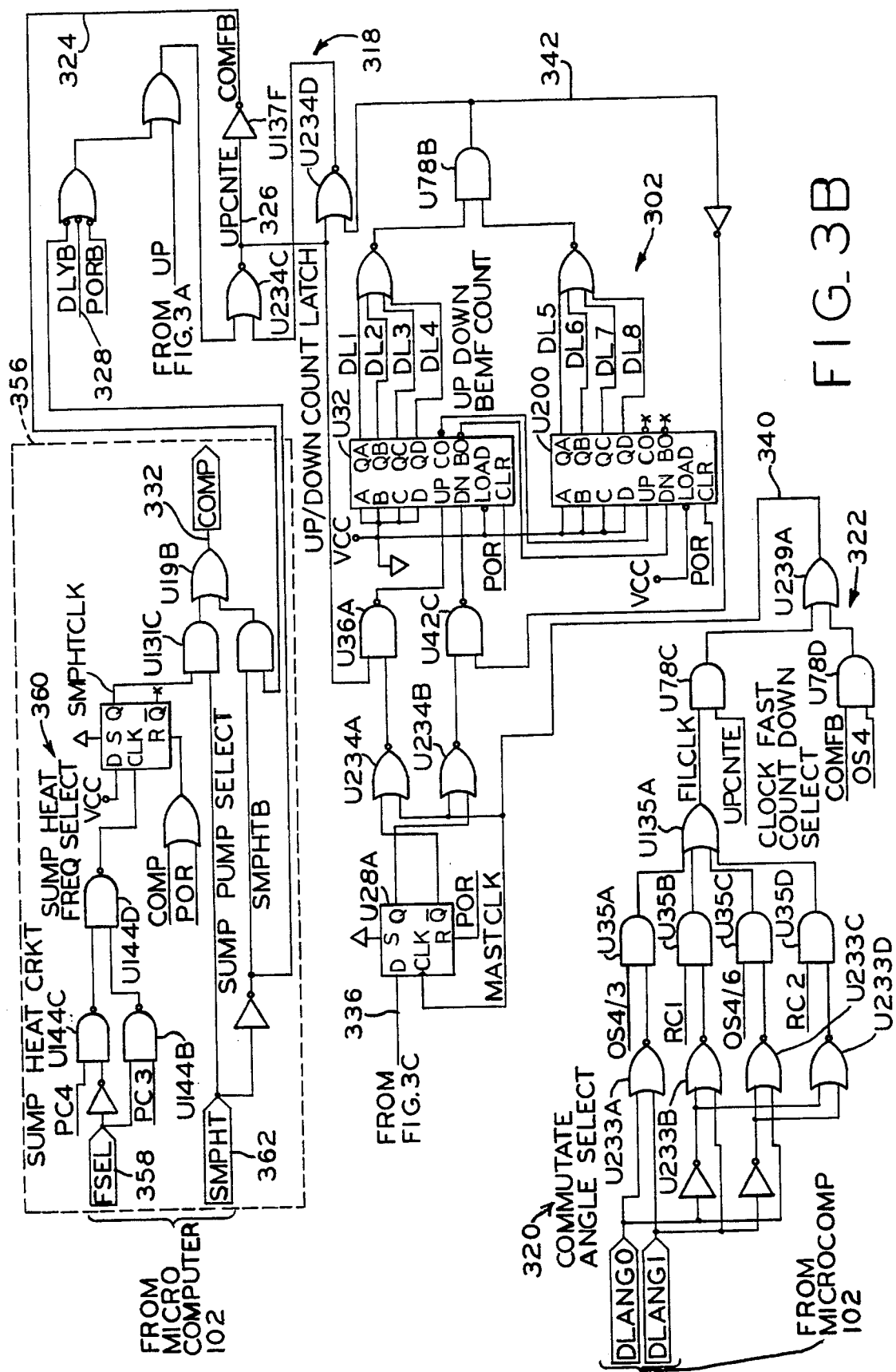
Figure 3C:
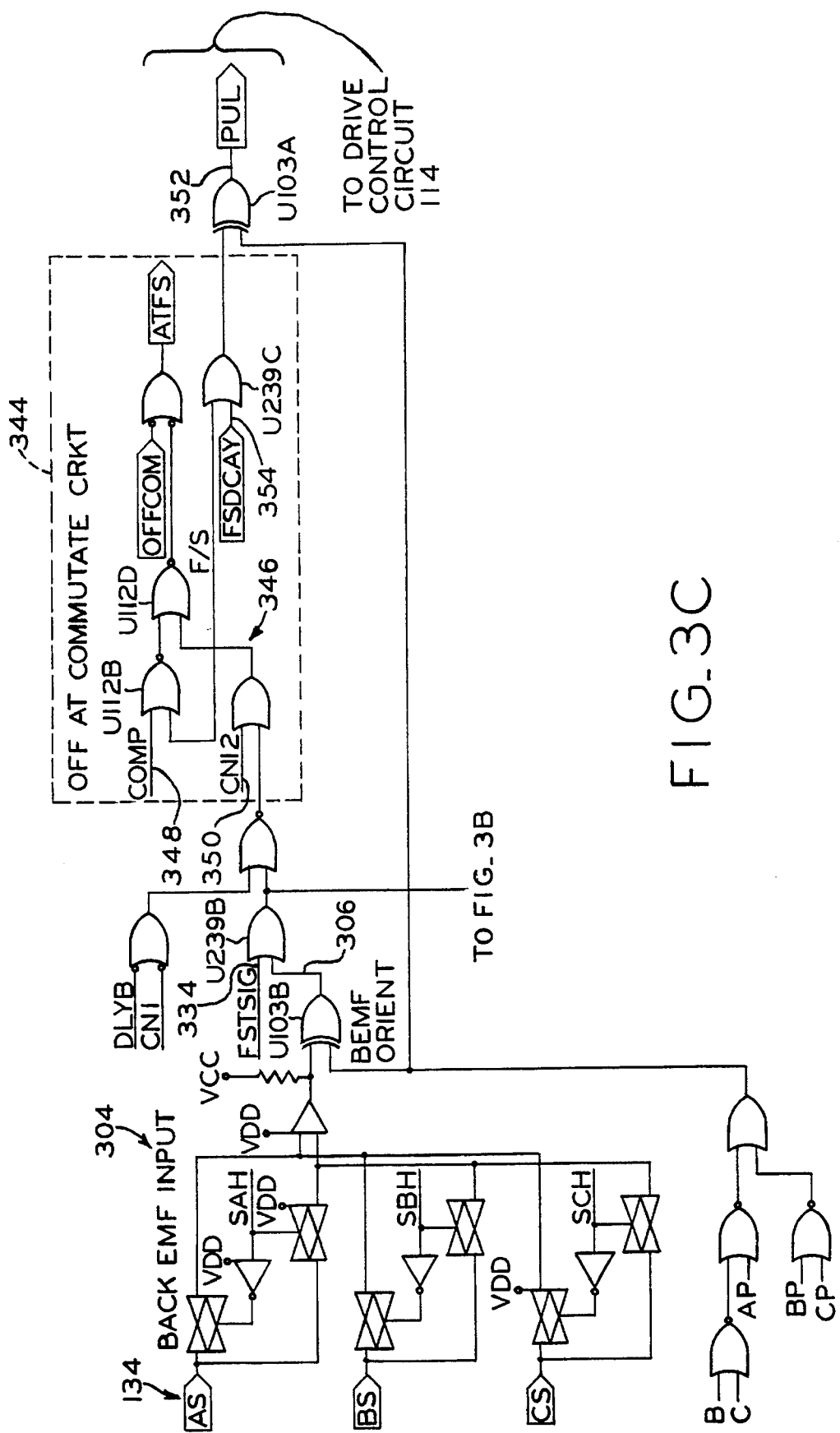

With respect to FIGS. 3A–3C, the optimum production of torque in motor 120 requires that commutation occurs at some fixed angle of rotational delay after zero crossings. ASIC 104 of system 100 calculates a commutation delay following zero crossings of the back EMF voltage in the windings by digital up/down counting in partial emulation of position sensing by back EMF volt*second integration. Coassigned U.S. patent application Ser. No. 08/108,328, the entire disclosure of which is incorporated herein by reference in its entirety, discloses incorporating back EMF voltage integration to provide robust and flexible position sensing. Back EMF voltage integration as disclosed by application Ser. No. 08/108,328, however, employs a transconductance amplifier. Advantageously, the present invention eliminates the need for a costly transconductance amplifier or similar circuit in ASIC 104.

In particular, application Ser. No. 08/108,328 discloses a means for detecting zero crossings including a multiplexer circuit for multiplexing the back EMF voltages. The multiplexed signal is compared to a reference level input signal to obtain a comparison signal. A noise timer then filters the comparison signal before it is input to a position sensing circuit. The position sensing circuit in turn provides a zero crossing detector signal. As further shown in application Ser. No. 08/108,328, commutation is controlled as a function of the elapsed time between commutations and the detected zero crossings.

Referring to FIGS. 3A–3C, ASIC 104 of the present invention need not identify an explicit moment of zero crossing in the back EMF voltage. Position sensing circuit 136 includes a commutation counter 302 (shown in FIG. 3B) which increments to a preset value during the time that the polarity of the BEMF signal indicates rotation past a zero crossing. The preset value is representative of an electrical delay angle following the zero crossing. In this manner, ASIC 104 obtains a maximum amount of time to filter the BEMF signal. However, since the polarity of BEMF could actually be the result of electrical noise impressed on the back EMF voltage, the counter 302 decrements its count when the signal polarity reverses. Thus, the count is repetitively counted partially up and then back down to zero in advance of the true zero crossing. After the zero crossing, counter 302 accumulatively counts up to the preset value, even though occasional reverse counts are experienced along the way. As such, position sensing circuit 136 advantageously performs a partial digital analog of back EMF volt*second integration. Further, the estimate of the preset value is varied according to the electrical delay angle which is desired on the basis the prior commutation interval count. In this embodiment, a commutation interval is defined to be the interval between consecutive commutation pulses of the commutation signal.

FIGS. 3A–3C show position sensing circuit 136. As shown in FIG. 3C, position sensing circuit 136 includes a multiplexer circuit 304 for multiplexing the sensed back EMF voltages of the windings. The multiplexer 304 generates the BEMF signal at line 306.

FIG. 3A shows a commutation interval timer 308 consisting of a ripple counter having flip flops U4A, U4B and U17A and a counter U5. The first three stages of the timer 308, i.e., the flip flops U4A, U4B and U17A, serve to count down an input clock signal, PCOB, via line 310 and synchronize operation with other functions of ASIC 104. The counter U5 times the significant commutation interval count which a commutation delay circuit 312 uses to provide the delay angle. Registers U8 and U9, included in commutation delay circuit 312, store a value representative of a preset electrical delay angle. Commutation delay circuit 312 further includes a NOR circuit 313 comprised of a series of NOR gates U7D, U6A-D, U7A-B and U23A interposed between the registers U8 and U9 and counter U5. As disclosed in application Ser. No. 08/108,328, the NOR circuit 313 serves to set a maximum time interval (i.e., an electrical angle less than the preset operating angle) when the speed drops below a preset minimum value. This feature serves to limit the number of bits that are counted for the delay angle as well as minimizes the delay time estimate being over run during rapid acceleration.

Referring to FIG. 3A, commutation delay circuit 312 includes a back EMF delay angle compare circuit 314 comprised of exclusive OR gates U16A, U11A-D and U123A-C. The back EMF delay angle compare circuit 314 generates a signal, UP, at line 316 to indicate when the preset value representative of the desired electrical delay angle matches the delay count in commutation counter 302. The UP signal, when high, sets an up/down count latch 318 (shown in FIG. 3B). The up/down count latch 318 either permits or inhibits the counting operation of commutation counter 302.

With respect to FIG. 4, exemplary up/down counting for determining commutation delay is shown in the form of a timing diagram. FIG. 4(a) shows the multiplexed back EMF signal, BEMF, of FIG. 2(b) for comparison. FIG. 4(b) illustrates the up and down counting performed by commutation counter 302 designated up/down BEMF count in comparison with the timing operation of commutation interval timer 308. As shown by the timing diagrams, commutation counter 302 increases its count to a preset value designated delay count during the time that the polarity of the BEMF signal indicates rotation past a zero crossing, i.e., BEMF is high. The preset value is representative of an electrical delay angle following the zero crossing. Since the polarity of BEMF could actually be the result of electrical noise impressed on the back EMF voltage, counter 302 decreases its count when the signal polarity reverses, i.e., BEMF is low. Thus, the up/down BEMF count is repetitively counted partially up and then back down to zero before the true zero crossing. After the zero crossing, counter 302 accumulatively counts up to the preset value, even though occasional reverse counts are experienced along the way. As such, position sensing circuit 136 advantageously performs a partial digital analog of back EMF volt*second integration. Further, the estimate of the preset value is varied according to the electrical delay angle which is desired on the basis the prior commutation interval count.

Referring again to FIGS. 3A–3C, FIG. 3B shows a commutate angle select circuit 320 including gates U233A-D, U35A-D and U135A. The commutate angle select circuit 320 preselects the commutation delay angle as a function of inputs, DLANG0 and DLANG1, from microcomputer 102. In a preferred embodiment, ASIC 104 determines the delay time for the commutation angle selected by a combination of the frequency used to time the commutation interval count, the specific bits compared for a match, and the frequency selected to perform the delay count in commutation counter 302. Commutate angle select circuit 320 defines the preset delay value to be a binary fraction of the count corresponding to the prior commutation interval thereby defining the commutation delay angle. In the alternative, commutate angle select circuit 320 selects the preset rate at which commutation counter 302 counts from a predefined set of frequencies thereby selecting the commutation delay angle.

In this embodiment, the frequency that counts the commutation interval, PCOB, is ½ of the base frequency, OS4, used for counting the delay count. Further, the bits that are compared for a match are effectively right shifted by four (e.g., divide by $2\alpha = 16$). Thus, the combination of base delay frequency and interval count frequency when right shifted is equivalent to dividing by 32. By definition, the electrical angle for a complete commutation interval in this embodiment is 60 degrees so that the base frequency delay angle is $60/32 = 1.875°$. Preferably, 1.875° delay is only used for the down count of commutation counter 302 following the field collapse voltage. ASIC 104 employs lower frequencies for the delay count following the zero crossing of the back EMF voltage. The following Table 1 illustrates the relationships:

TABLE 1

| Clock Designation | Frequency (kHz) | Delay Angle | Status |
|---|---|---|---|
| OS4 | 625 | 1.875 | Count down after field collapse |
| OS4/3 | 208 | 5.625 | DLANG1 = 0, DLANG0 = 0 |
| PC1 = OS4/4 | 156 | 7.5 | DLANG1 = 0, DLANG0 = 1 |
| OS4/6 | 104 | 11.25 | DLANG1 = 1, DLANG0 = 0 |
| PC2 = OS4/8 | 78 | 15 | DLANG1 = 1, DLANG0 = 1 |

In other words, commutation counter 302 counts at a preset rate and increases its count when BEMF is of one polarity and decreases its count when BEMF is of an opposite polarity. Commutation counter 302 generates a corresponding commutation signal when the count reaches the preset value. In this manner, position sensing circuit 136 generates the corresponding commutation signal a predetermined commutation delay angle after a corresponding zero crossing wherein the preset value corresponds to the commutation delay angle. The commutation interval timer 308 measures a commutation interval between consecutive commutation pulses as a function of the count wherein the preset value is a function of the count corresponding to a prior commutation interval.

As shown in FIG. 3B, a clock fast count-down select circuit 322 controls the count down after the field collapse voltage in the windings has substantially decayed. The fast count-down circuit 322 consists of a multiplexer circuit having gates U78C, U78D and U239A and selects the count frequency, OS4, for 1.875° delay angle when a flyback signal, COMFB, is logic level high at line 324 output from up/down count latch 318. The COMFB signal indicates the ending of field collapse voltage in the windings and matches the up status of up/down count latch 318. During this count down after field collapse, up/down count latch 318 inhibits up counting by counter 302 when a latch signal, UPCNTE, is low at line 326 from a gate U234C. The COMFB signal is the inverse of the UPCNTE signal. In this manner, system 100 safeguards against commutation counter 302 counting up when the new value representative of a preset electrical delay angle that is loaded in registers U8 and U9 is less than the previous value even though there is no longer a match at the back EMF delay angle compare circuit 314. In the alternative, a magnitude comparison could be used to set up/down latch 318. However, such an approach requires additional gates.

Up/down count latch 318 is held in the COMFB high state for a minimum interval of time by a signal, DLYB, at line 328. A flip flop 330 comprised of gates U3A and U3B (shown in FIG. 3A) outputs the DLYB signal as a function of the commutation signal, COMP, and a signal, STLCLK. The time that is required for counter U5 to initially count to CN1 after the COMP pulse has reset commutation interval timer 308 ensures that a transition from the present switching state to the next state does not provide a false indication that the field collapse voltage has been significantly reduced. The status of up/down count latch 318 is reversed when the up/down BEMF count reaches zero.

The transition of a high COMFB signal from an inverter U137F at line 324 and, consequently, the COMP signal from a gate U19B at line 332, results in the incrementing of a state counter (not shown) causing field rotation in motor 120. Application Ser. No. 08/108,328 discloses a state counter circuit for a motor such as an electronically commutated motor in FIG. 12 of that application. The state counter receives the COMP signal for inputting to drive control circuit 114 for controlling its gate drives. The state counter determines the sequence in which the gate drives operate and which winding is unenergized for back EMF sensing. The state counter also determines the direction of rotation of motor 120.

FIG. 3C, shows an exclusive OR gate U103B for orienting the multiplexed back EMF voltages provided by multiplexer 304. The count direction is set by the status of the BEMF signal at line 306 after orientation. However, when back EMF voltage is not present, such as when motor 120 is started, a forced start signal, FSTSIG, via line 334 inserts an up count status into commutation counter 302 from an OR gate U239B to a flip flop U28A via line 336. The FSTSIG signal is a function of a signal, FSTART, provided by a forced start commutate circuit 338 (shown in FIG. 3A).

Referring again to FIG. 3B, clock fast count-down select multiplexer 322 outputs a master clock signal, MASTCLK, at line 340 from the gate U239A. The rising edge of the MASTCLK signal clocks in the up/down status at the D flip flop U28A to prepare for the actual count that will occur on the falling edge of the clock signal. In a preferred embodiment of the invention, commutation counter 302 is comprised of a pair of counters U32 and U200. A pair of NOR gates U234A and U234B steer the falling edge of MASTCLK to an appropriate UP or DN port of the counters U32 and U200. If up counting is inhibited by a low UPCNTE signal at line 326, a gate U36A blocks execution of the count. Similarly, if down counting is inhibited by a high at line 342 from an AND gate U78B (i.e., counter 302 is at zero and underflow must be inhibited), a gate U42C blocks execution of the count. In contrast to inhibiting an up count, though, system 100 only inhibits the down count when the count is at zero.

Therefore, position sensing circuit 136 constitutes a circuit for sensing a back EMF voltage in the windings and for generating the BEMF signal, representative of the sensed back EMF voltage. IC 104 in general and, particularly, position sensing circuit 136, constitutes a control circuit responsive to the BEMF signal for generating the commutation signal.

Up/down latch 318 inhibits commutation counter 302 from increasing its count and only permits commutation counter 302 to decrease its count during periods following the commutation signal when the field collapse voltage is present and wherein commutation counter 302 decreases its count at a rate greater than commutation counter 302 increases its count. Up/down latch 318 inhibits commutation counter 302 from increasing its count regardless of the change that occurs in the preset value at each commutation.

At low speed operation, the rate of rise of current is at a maximum due to the low back EMF voltage of the windings of motor 120. The rate of rise of current is at a maximum as the voltage to force current into the opposing inductance is at a maximum due to the low opposing back EMF. At low speed, the current in the winding that was commutated off is opposed by a minimum back EMF and, therefore, has a minimum rate of fall. Only the current that is increasing in the winding that was commutated on is present in the shunt resistor 160, and can be directly regulated. The third winding that remained on during commutation will have a summation of the two currents (the increasing current in the winding commutated on and the falling current in the winding commutated off). As a result, the third current can exceed the current regulation threshold, i.e., the analog of IOUT, by as much as 140% at low motor speeds. As an example, in an electronically commutated motor designed for minimum cost, excessive current can result in demagnetization. This problem only exists at speeds less than approximately 47% of the unregulated no load speed. At 47% of the no load speed, the rate of rise of current is offset by the rate of fall in current. Thus, in this instance the summation of current in the third winding will not exceed the regulate value.

Referring again to FIG. 3C, an off-at-commutate circuit 344, preferably included in drive control circuit 114, operates so that conduction of motor phase current is initiated when the field collapse voltage has substantially decayed for operation of motor 120 below approximately ½ no load speed. The off-at-commutate circuit 344 inhibits switching events of the power switching devices of inverter bridge 118 in advance of the back EMF voltage during periods when the field collapse voltage is present. Off-at-commutate circuit 344 prevents current in the winding commutated on from rising until the falling current in the winding commutated off is detected as having reached zero. The back EMF position sensing circuit 136 detects the significant reduction in field collapse voltage.

Off-at-commutate circuit 344 includes a latch 346 comprised of gates U112B and U112D. The commutation signal, COMP, sets the latch 346 via line 348. A low output signal from the gate U103B, i.e., the oriented BEMF signal, indicates the field collapse voltage has substantially decayed and resets latch 346. Similarly, a count to CN12 at line 350 from commutation interval timer 308 resets latch 346. When latch 346 is set and a signal, OFFCOM, from microcomputer 102 is high, off-at-commutate circuit 344 sends a signal, ATFS, to speed regulation circuit 144. The ATFS signal inhibits turn on of the PWM transistor of inverter bridge 118. The circuit for inhibiting the PWM transistor was shown in FIG. 4 of application Ser. No. 08/219,022. In this manner, off-at-commutate circuit 344 essentially forces on or keeps off current at commutation depending on the field collapse voltage in the windings.

Off-at-commutate circuit 344 by its output signal, PUL, further acts as a rail select for selecting and pulse width modulating one of the power switching devices to control the rate of current decay in the windings. FIG. 3C shows an exclusive OR gate U103A which permits selection of which transistor of inverter bridge 118 is to be pulse width modulated depending on the back EMF in the windings. The gate U103A outputs a signal, PUL, via line 352 for controlling whether an upper transistor or a lower transistor of inverter bridge 118 is pulse width modulated. The choice determines whether or not current decays rapidly after commutation. Additionally, the choice determines whether the BEMF signal is more noise prone before or after the zero crossings of the back EMF voltage. In the illustrated embodiment, off-at-commutate circuit 344 operates so that a minimum of time is necessary to commutate the current in the windings to zero. When latch 346 is set, off-at-commutate circuit 344 forces the selection of a fast decay mode for the duration of the off time. In this mode, noise in the BEMF signal generally occurs after the zero crossing.

System 100 further provides the option of continuously operating ASIC 104 in the fast decay mode. Microcomputer 102 provides an input signal, FSDCAY, at input 354 of a gate U239C for instructing off-at-commutate circuit 344 to operate in the fast decay mode. In this manner, the mode that best facilitates back EMF position sensing and restriction of current at low speed can be selected according to the particular application.

In a preferred embodiment, off-at-commutate circuit 344 constitutes a circuit for inhibiting switching events of the power switching devices in advance of the back EMF voltage during periods when the field collapse voltage is present. Further, off-at-commutate circuit 344 constitutes a circuit for selecting and pulse width modulating one of the power switching devices to control the rate of current decay in the windings.

Referring again to FIG. 4, exemplary commutation is shown in the form of a timing diagram. With respect to commutation and off-at-commutate circuit 344, FIG. 4(c) shows the COMFB signal relative to the COMP signal provided by position sensing circuit 136 and the OFFCOM signal provided by microcomputer 102. Inverter bridge 118 commutates power to the windings of motor 120 as a function of the commutation signal, COMP. In this embodiment, a commutation interval is defined to be the interval between consecutive commutation pulses of the COMP signal. Further, FIG. 4(c) illustrates the ATFS signal for inhibiting turn on of the PWM transistor of inverter bridge 118 and the signal PWMB which causes pulse width modulation of the power provided to the windings.

Referring again to FIG. 3B, a sump heat circuit 356 causes heating of the refrigerant in compressor 124 before the rotor of motor 120 is rotated. When cold starting motor 120, refrigerant in compressor 124 may be in a liquid state. Due to the general incompressibility of liquids, damage to compressor 124 can result if motor 120 is started when liquid refrigerant is in the intake of compressor 124. For this reason, it is necessary to convert lidid refrigerant to a gas before starting motor 120. In a conventional motor, a separate heating element on the outside of the sump of compressor 124 is used to heat the refrigerant. The windings of motor 120 are, however, available as an alternate heater, which is better located to effect the desired function due to their proximity to the sump. Persons skilled in the art will understand that the use of motor windings to perform a sump heating function may also be readily implemented with motor and control circuits different from those specifically disclosed herein. For example, this aspect of the invention may be applied to applications wherein switched reluctance motors and variable speed induction motors, in addition to electronically commutated motors, are used for driving a refrigerator compressor.

According to the invention, position sensing circuit 136 is responsive to the sump heat circuit 356 to generate a commutation signal having a commutation rate corresponding to a motor speed exceeding that at which inertia of the rotor permits rotation. In other words, sump heat circuit 356 disables normal back EMF position sensing and forces high frequency commutation of the stator windings of motor 120. In this embodiment of the invention, current is supplied to motor 120 in a manner that will not cause rotation of the rotor or produce an excess magnitude of current in the windings. Although this has been done for variable speed induction motors by allowing an inverter in the motor drive to rotate very slowly while regulating the current, it is not an acceptable method for other types of motors, for example, an electronically commutated motor. However, since motor 120 has torque at low speed, its operation is very like a stepper motor. In this embodiment, forcing inverter bridge 118 to a very high speed commutation rate, one which far exceeds the rate at which the rotor inertia would permit movement, heats the windings.

As stated above, sump heat circuit 356 forces a high frequency commutation rate which limits the current developed in the windings of motor 120. However, if the current exceeds the peak current reference level, current regulation by ASIC 104 causes lower harmonics producing an audio emission during heating of the compressor sump. Since higher frequencies of commutation produce lower current, microcomputer 102 provides at least two sump heat forced frequencies by an input, FSEL. The FSEL signal is input via line 358 to a multiplexer 360 comprised of gates U144B, U144C and U144D. The multiplexer 360 allows current magnitude to be selected during sump heating by selecting the commutation rate from a predefined set of commutation rates. Since ASIC 104 regulates the current in the windings as a function of the peak current reference level, sump heat circuit 356 advantageously provides for selection of the current below the peak current reference level. In this manner, system 100 reduces noise in motor 120 during sump heating. The following Table 2 lists winding frequency and apparent speed for motor 120 having four poles:

TABLE 2

| FSEL | CLK | Motor kHz | Apparent RPM |
|---|---|---|---|
| 0 | PC4 | 3.26 | 97656 |
| 1 | PC3 | 5.51 | 195313 |

Microcomputer 102 causes the selected sump heat frequency to be inserted into the commutation signal, COMP, by providing a high signal at the input, SMPHT, via line 362 to a gate U131C.

FIGS. 5A–5E regard speed regulation of the present invention and show speed regulation circuit 144 in greater detail. Accurate speed regulation, provided by system 100, facilitates operation of motor 120 at the lowest speed possible without risking operation at a speed below the minimum speed required to pump oil into the bearings of compressor 124. Further, accurate speed regulation ensures consistent operation of motor 120 for driving compressor 124 at its optimum speed.

Referring again to the block diagram of ASIC 104 in FIG. 1, microcomputer 102 provides serial data for the commutation reference interval store circuit 146 as well as the integrated speed error circuit 152. The commutation reference interval timer 148 compares the actual commutation interval to the reference interval stored in circuit 146 and determines whether the speed of motor 120 is too fast or too slow. In a preferred embodiment of the invention, system 100 defines the difference between the measured interval between commutation pulses and the reference interval as a digital velocity error, or speed error. Of particular interest in the speed regulation method of system 100 is the sign, positive or negative, of the digital velocity error. A positive error indicates an underspeed condition while a negative error indicates an overspeed condition. At the end of each commutation state, speed regulation circuit 144 instructs microcomputer 102 that the speed of motor 120 is either too fast or too slow. In a preferred embodiment, microcomputer 102 includes the speed error pre-counter 103 which integrates the velocity error by summing the signs of consecutive digital velocity errors. In determining whether motor 120 is operating in an overspeed or underspeed condition, commutation reference interval timer 148 gates a count frequency obtained from the frequency selection circuit 150 to the preload up/down counter 154. Preload up/down counter 154 constitutes a speed regulation counter which sums the velocity error from reference interval timer 148 and the integrated velocity error stored in integrated speed error circuit 152 and developed by microcomputer 102. The accumulated result of this summation is stored and compared to a 20 kHz eight bit count from counter 140 to generate the pulse width modulated signal, IOUT. In turn, the RC circuit 156 averages IOUT to produce a reference voltage at current comparator 158 for setting the peak current to be delivered to the windings of motor 120.

In this embodiment of the invention, speed error pre-counter 103 is a pre-count register maintained in the random access memory of microcomputer 102. Thus, microcomputer 102 adds the number of underspeed occurrences or subtracts the number of overspeed occurrences from speed error pre-counter 103. The TOO FAST or TOO SLOW determinations are obtained at each commutation from serial communication line 110 of ASIC 104. The pre-count is continued until an absolute delta count (either positive or negative) is obtained at a programmable value. When speed error pre-counter 103 achieves the delta count, the integrated velocity error (also referred to as the "current out integrated speed error" or the "sum velocity error") has one bit either added or subtracted according to the direction of the count. The revised or altered integrated velocity error is then communicated through serial communication line 106 and stored in integrated speed error circuit 152. Preferably, the absolute delta count is changed to alter system gain. In other words, if the absolute delta count is increased, then system 100 must experience accumulatively a greater number of TOO SLOW signals, for example, before the integrated speed error is increased by one count; or accumulatively a greater number of TOO FAST signals before the integrated speed error is decreased by one count. As an example, microcomputer 102 accomplishes the administration of the absolute delta count as either an unsigned value, such as 16, or a signed value, such as ±8. These values are operationally equivalent since both the unsigned value 16 and the signed value ±8 require an absolute delta of 16 counts to go from a status of either increasing the integrated velocity error to decreasing the integrated velocity error (or in the reverse sequence).

In the alternative, microcomputer 102 computes motor speed based on the commutation interval measured by ASIC 104 and corrects the integrated velocity error accordingly. In yet another alternative, microcomputer 102 obtains the magnitude of the velocity error from ASIC 104 in the form of serial communication of the output of preload up/down counter 154 less the integrated velocity error previously communicated to ASIC 104 and corrects the integrated velocity error based on this information. Those skilled in the art will understand suitable alternative means for maintaining the integrated velocity error.

Application Ser. No. 08/108,328 describes a means for achieving basic speed velocity error correction for underspeed operation by incrementing a current reference magnitude counter for the interval of time that the commutation interval exceeded a reference interval. If the rate of counting is suitable at high speeds, however, unstable operation is possible at low speeds. Conversely, a count rate providing stable operating at low speeds may have insufficient capability to modulate torque at high speeds, i.e., the servo gain is too low. Additionally, only incrementing to higher current reference magnitude for underspeed may produce excessive undershoot in response to a command to drop from a high to a low speed. Advantageously, system 100 of the present invention provides improved speed regulation over wide speed ranges, particularly in regard to stable operation at low speed by counting at a rate determined by the preselected time in an overspeed or underspeed condition and having selectable "gain" in addition to up/down counting for velocity error.

As shown in FIG. 5A, commutation reference interval timer 148 is comprised of a pair of timers U181 and U97. In a preferred embodiment of the invention, the timers U181 and U97 alternate in their operation. By alternating, down counting occurring in response to an overspeed condition is facilitated. Although a single timer could be used, down counting would be limited to every other commutation interval since the down counting operation takes place after a TOO FAST state has terminated and before the reference interval is timed out. Two counters, such as timers U181 and U97, allow a reference interval to be generated for each newly initiated state while counting down proceeds to the reference interval for the prior state. A D flip flop U183A selects whether timer U181 or timer U97 is to be reset at commutation.

Commutation reference interval timer 148 further includes a multiplexer circuit 502 consisting of multiplexers U178, U179 and U180 for multiplexing the outputs of timers U181 and U97. The D flip flop U183A also selects whether the output of timer U181 or timer U97 is to be multiplexed by the multiplexer circuit 502 and input to a set of magnitude comparators U101, U102 and U122 (shown in FIG. 5B), also included in commutation reference interval time and compare circuit 148.

Referring to FIG. 5B, speed regulation circuit 144 sets the result of the magnitude comparison via line 504 into a latch 506. The latch 506 includes gates U85B and U23C and provides for glitch filtering by a signal, V, before outputting a signal, COMREF or COMREFB, at lines 508 and 510, respectively. As shown in FIG. 5C, the multiplexer circuit 502 selects a frequency for a global change of the "gain" of the velocity error computation. In this sense, "gain" refers to the rate that counts are added to or subtracted from preload up/down counter 154 for the duration of the too slow or too fast state signaled by reference interval timer 148. In the following Table 3 of selection options, full torque RPM error refers to the percentage of the target speed that the operating speed must be in error to produce a full count in preload up/down counter 154 (e.g., 255 counts for an eight bit counter).

TABLE 3

| VGAIN | | Base | | Full Torque | |
|---|---|---|---|---|---|
| 1 | 0 | Clock | kHz | RPM Error | Relative Gain |
| 0 | 0 | OS4 | 625 | 66% | low |
| 0 | 1 | OS3 | 1250 | 48% | med low |
| 1 | 0 | OS2 | 2500 | 33% | med high |
| 1 | 1 | OS1 | 5000 | 20% | high |

FIG. 5C shows frequency selection circuit 150 in detail. Microcomputer 102 provides a pair of velocity gain set inputs, VGAIN0 and VGAIN1, via lines 512 and 514, respectively, for selecting a frequency which is counted down by counters U139A and U139B. The counters U139A and U139B output a six bit count via lines 516. Frequency selection circuit 150 further includes an exclusive OR network 518 for comparing this six bit count to the six most significant bits of signals STI06 through ST111 from commutation reference interval store circuit 146. When the reference interval is large, the resultant velocity error count frequency, CLKSEL and CLKSELB, at lines 520 and 522, respectively, are proportionally slow. When the reference interval is small, CLKSEL and CLKSELB are fast. It is this forced proportionality between the input speed commutation reference interval and the velocity error count frequency that produces a constant percent RPM speed error for full torque (as shown in Table 3).

Referring to FIG. 5D, preload up/down counter 154 is comprised of counters U68 and U69. A pair of gates U146A and U146B gate the up/down count of the counters U68 and U69. Preload up/down counter 154 increases its count for the duration of time between the termination of the speed commutate reference interval (as stored in circuit 146) and the termination of the state currently in process. Conversely, preload up/down counter 154 decreases its count for the duration of time between the termination of the state currently in process and the termination of the speed commutate reference interval (as stored in circuit 146). A pair of signals, PRIORCMP and COMREF, and their inverses, are representative of operation which is either too fast or too slow. The gate U146A gates the down count in response to an overspeed condition which is indicated by the PRIORCMP and COMREFB signals both being high. However, if preload up/down counter 154 is at zero, another gate U147 inhibits any further down counting. Similarly, the gate U146B gates the up count in response to an underspeed condition which is indicated by the PRIORCMPB and COMREF signals both being high. Preferably, counting is again blocked from overflowing. However, in this case, microcomputer 102 sends data signals, MXDTY0-MXDTY7, to speed regulation circuit 144 to limit the count to a maximum value. This feature permits calibration at the factory to ensure that the current does not exceed a desired maximum. Preload up/down counter 154 includes a pair of magnitude comparators U71 and U72 providing the test to ensure that the count does not exceed the input data MXDTY0-7. In an alternative embodiment, a test for all logic level high could be used to prevent an overflow but without enabling factory software installed calibration.

A pair of registers U59 and U60 store the accumulative count from counters U68 and U69. In this embodiment, magnitude comparator circuit 138, consisting of comparators U51 and U54, compare the stored accumulative count to the 20 kHz eight bit count (0S2 through PC4) from counter 140 to generate the PWM signal IOUT. As shown in FIG. 5E, a gate U62C initiates the storage of the accumulative count when both a COMP pulse and a COMREF period have timed out. Immediately following the storage of the count in preload registers U59 and U60, preload up/down counter 154 is reloaded with the data from microcomputer 102, namely, signals INTG0 through INTG7 via integrated speed error circuit 152. Components U56A, U120A, U76B and U62A time the storage of data followed by the reloading of counters U68 and U69.

As stated above, speed regulation circuit 144 operates to regulate the speed of motor 120. Commutation reference interval timer circuit 148 measures an interval between commutation pulses and compares it to the interval stored in commutation reference interval store 146 corresponding to a desired motor speed. The difference signal generated by the comparison defines a speed error. Microcomputer 102 integrates the speed error and generates an integrated speed error signal. Also, microcomputer 102 includes speed error pre-counter 103 for accumulating the speed error and generating a signal for changing the integrated speed error signal when the speed error accumulates to a preset amount. The preset amount is selected to ensure adequate response without introducing instability. Speed regulation circuit 144 further includes a speed regulation counter, constituted by preload up/down counter 154, responsive to the integrated speed error signal and the difference signal. The rate of counting up or down is a function of the speed of motor 120 and is also determined by a global rate selected from a predefined set of values. Preload counter 154 cooperates with magnitude comparator circuit 138 for generating the peak current reference signal, IOUT. In this manner, speed regulation circuit 144 regulates the current in the windings as a function of the peak current reference signal thereby to regulate the speed of motor 120.

FIG. 6 illustrates exemplary timing diagrams of the speed regulation strategy as performed by the circuitry of FIGS. 5A–5E. FIG. 6(a) shows the timing of the commutation reference intervals by counters U181 and U97. FIG. 6(b) shows exemplary COMREF and PRIORCMP signals and FIG. 6(c) shows the summing of the velocity error accomplished by preload up/down counter 154 in response to the COFIREF and PRIORCMP signals. Duty cycle out represents the output of preload up/down counter 154.

As described above, shunt 160 senses current in the windings and drive control circuit 114 discontinues power to each of the windings in which the current reaches the peak current reference level. The peak current reference level is set by action of speed regulation circuit 144. FIG. 7 illustrates a variable off timer circuit 702 operating in response to an off time angle select circuit 704 for timing a predetermined period of time in which current is off in the windings and allowed to decay.

The refrigerator ASIC of application Ser. No. 08/108,328 employed variable off time for current control as a function of motor speed to minimize watt loss and to assure smooth torque production. System 100 of the present invention employs this same feature with the added flexibility of selectable electrical angles of off time. The advantage for a wide range of applications is that not all motors have the same response to a particular angle of off time. Therefore, the selectable feature allows the control to be tailored to motor 120.

Referring to FIG. 7, the off time angle select circuit 704 selects the predetermined period of off time from a predefined set of values as a function of a measured commutation interval for minimizing losses and for providing smooth torque production. In a preferred embodiment, microcomputer 102 provides inputs, OFFTMR0 and OFFTMR1, via lines 706 and 708, respectively, for selecting one of four off time angles. The following Table 4 illustrates the options:

TABLE 4

| OFFTMR | | CLK | kHz | Angle |
|---|---|---|---|---|
| 1 | 0 | | | |
| 0 | 0 | PC2 | 78.125 | 15.00 |
| 0 | 1 | PC1 | 156.25 | 7.50 |
| 1 | 0 | OS4/6 | 104.17 | 11.25 |

TABLE 4-continued

| OFFTMR | | CLK | kHz | Angle |
|---|---|---|---|---|
| 1 | 0 | | | |
| 1 | 1 | OS4/3 | 208.34 | 5.63 |

The OFFTMR0 and OFFTMR1 inputs select a clock frequency at which the variable off timer 702 increments when current is turned off and, thus, selects an off time. Off time angle select circuit 704 provides the clock frequency signal to variable off timer 702 via line 710. Variable off timer 702 includes a timer U14 which begins counting when a PWM reset signal, OFFTMR, via line 711 from drive control circuit 114 is low. Variable off timer 712 includes an exclusive OR network 708 for converting the timed count of the timer U14 to an electrical angle. The exclusive OR network 712 compares the timed count to the commutation interval time stored in registers U8 and U9 (shown in FIG. 3A). A gate U15A develops a begin PWM signal, BPWM, at line 714 for causing drive control circuit 114 to resume conduction in the windings. The BPWM signal results from either a commutation or the timing out of variable off timer 702. Further, the SMPHT signal is input to variable off timer 702 via line 716 from microcomputer 102 via shift register 108. SMPHT disables variable off timer 702 during sump heating of compressor 124.

Figure 8:
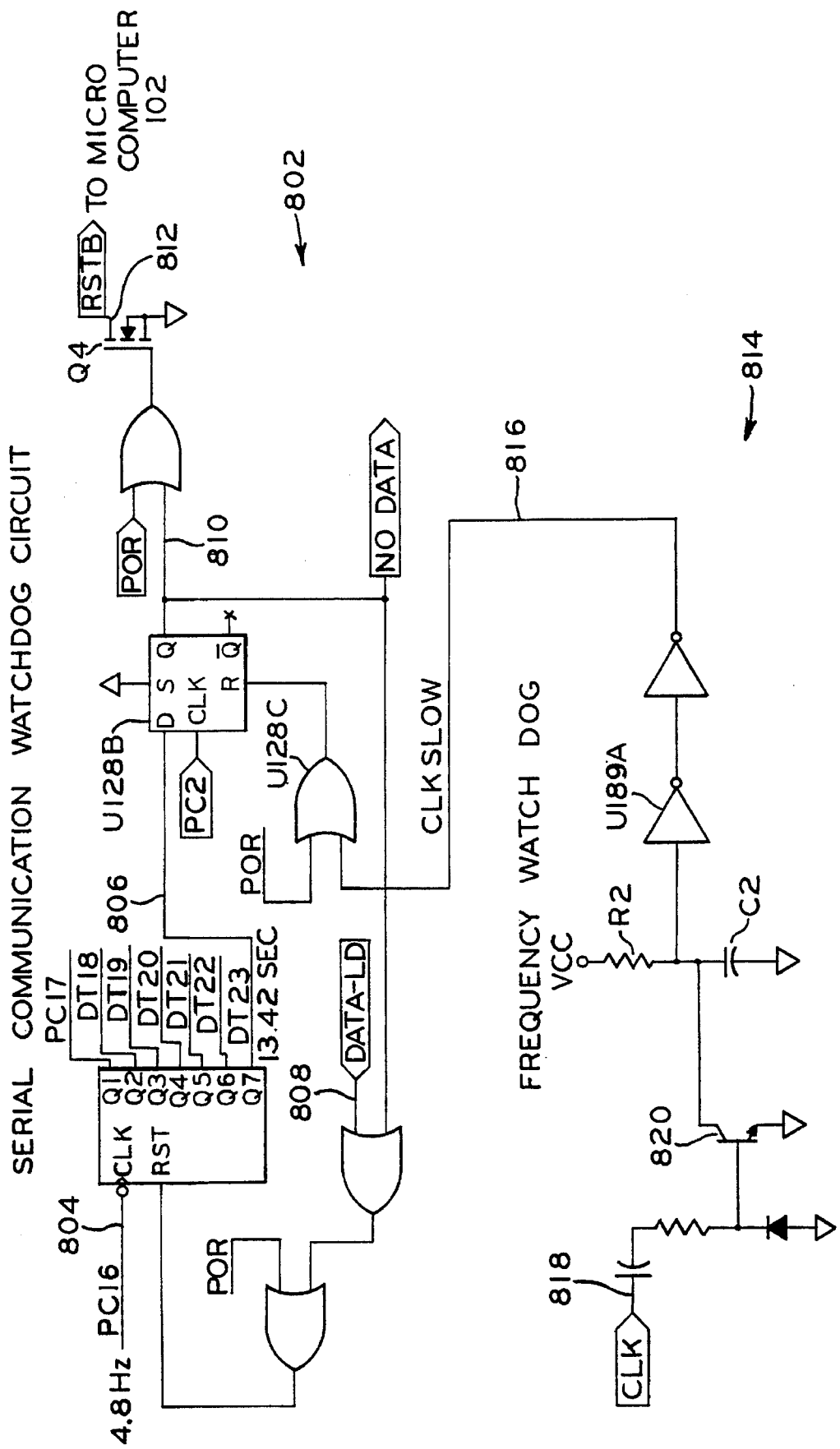
FIG. 8 is a schematic diagram of one preferred embodiment of a serial communication watchdog circuit of the ASIC of FIG. 1.

With respect to FIG. 8, ASIC 104 also includes various protective control circuits including a serial communication watchdog circuit 802. The watchdog circuit 802 resets microcomputer 102 when no data signals are input to shift register 108 for a predetermined interval of time. Watchdog circuit 802 generates a reset signal, RSTB, having a predetermined duration for resetting microcomputer 102.

In a preferred embodiment of the invention, a counter U188 counts a clock signal, PC16, input to the counter U188 via line 804. The PC16 signal has a frequency of 4.8 Hz and counter U188 counts PC16 until an output, DT23, at line 806 reaches a high state after 13.42 seconds. A signal, DATA-LD, input to watchdog circuit 802 via line 808 indicates that shift register 108 has accepted serial data during the interval timed by counter U188. In this embodiment, counter U188 resets and timing begins again at zero if the DATA-LD signal is high. In contrast, if shift register 108 has not received and accepted serial data during this interval, the high state of the DT23 signal enables a flip flop U128B which is clocked by a clock signal, PC2. The flip flop U128B generates a temporary fault line, NO DATA, at line 810 and watchdog circuit 802 generates the RSTB signal at line 812 in response thereto. The RSTB signal by direct communication to microcomputer 102 resets microcomputer 102.

Referring further to FIG. 8, watchdog circuit 802 includes a frequency watchdog circuit 814 which generates a signal, CLKSLOW, via line 816 for terminating the RSTB signal. By terminating RSTB, the frequency watchdog circuit 814 allows microcomputer 102 to restart after being reset. In applications causing counter U188 to stop on RSTB, PC2 cannot be relied upon to terminate RSTB. In this embodiment, the CLKSLOW signal is combined with the power on reset signal, POR, at a NOR gate U128C to reset the flip flop U128B. Frequency watchdog circuit 814 provides CLKSLOW in response to a clock frequency which is too low. According to the invention, a signal, CLK, input via line 818 is AC coupled to a transistor 820 so that every rising edge of CLK discharges a capacitor C2. If the rising edges stop or drop below the rate at which capacitor C2, in combination with a resistor R2, will charge to the threshold of an inverter U189A, a high at CLKSLOW is generated. In turn, CLKSLOW terminates RSTB. In other words, resetting microcomputer 102 causes a loss of clock signal and termination of RSTB.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for driving a rotatable component comprising:
    a motor having a stationary assembly and a rotatable assembly in magnetic coupling relation thereto, the stationary assembly including windings selectively energized in at least one preselected sequence, the rotatable assembly being in driving relation to the rotatable component;
    a circuit for generating a BEMF signal representative of a back electromotive force (EMF) in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;
    a control circuit responsive to the BEMF signal for generating a commutation signal, the control circuit including a commutation counter counting at a rate, the commutation counter incrementing its count when the BEMF signal is of the first polarity and decrementing its count when the BEMF signal is of the second polarity, and generating a corresponding commutation signal when the count reaches a commutation delay value; and
    power switching devices responsive to the commutation signal for selectively connecting a power supply to the windings in the preselected sequence to produce an electromagnetic field for rotating the rotatable assembly.

2. The system of claim 1 wherein the control circuit generates the corresponding commutation signal a predetermined commutation delay angle after a corresponding zero crossing and wherein the commutation delay value corresponds to the commutation delay angle.

3. The system of claim 2 wherein the commutation signal includes a series of commutation pulses and further comprising a commutation interval timer for measuring a commutation interval between consecutive commutation pulses as a function of the count and wherein the commutation delay value is a function of the count corresponding to a prior commutation interval.

4. The system of claim 3 further comprising a circuit for defining the commutation delay value to be a binary fraction of the count corresponding to the prior commutation interval thereby defining the commutation delay angle.

5. The system of claim 2 further comprising a circuit for selecting the rate at which the commutation counter counts from a predefined set of frequencies thereby selecting the commutation delay angle.

6. The system of claim 5 wherein inductive current in the windings produces a field collapse voltage in advance of the back EMF and further comprising an up/down latch for inhibiting the comutation counter from increasing its count and only permitting the commutation counter to decrease its count during periods following the commutation signal when the field collapse voltage is present and wherein the commutation counter decreases its count at a rate greater than the commutation counter increases its count.

7. The system of claim 6 wherein the up/down latch inhibits the commutation counter from increasing its count when the commutation delay value is less than the count corresponding to the prior commutation interval.

8. The system of claim 1 wherein inductive current in the windings produces a field collapse voltage in advance of the back EMF and further comprising a circuit for inhibiting switching events of the power switching devices in advance of the back EMF during periods when the field collapse voltage is present whereby switching events during field collapse voltage are inhibited when the motor is operating below approximately ½ no load speed.

9. The system of claim 8 wherein the inhibiting circuit includes a circuit for selecting and pulse width modulating one of the power switching devices to control the rate of current decay in the windings.

10. The system of claim 1 wherein the rotatable component is a compressor which circulates refrigerant through an evaporator and further comprising a sump heat circuit for causing heating of the refrigerant before the rotatable assembly is rotated and wherein the control circuit is responsive to the sump heat circuit to generate the commutation signal so that the commutation signal has a commutation rate independent of the BEMF signal and corresponding to a motor speed exceeding that at which inertia of the rotatable assembly permits rotation whereby current in the windings heats the windings thereby heating the refrigerant of the compressor.

11. The system of claim 10 wherein the control circuit regulates the current in the windings as a function of a peak current reference level and wherein the sump heat circuit includes a circuit for selecting the commutation rate from a predefined set of commutation rates for selecting a magnitude of the current in the windings below the peak current reference level thereby reducing noise in the motor.

12. A system for driving a rotatable component comprising:

a motor having a stationary assembly and a rotatable assembly in magnetic coupling relation thereto, the stationary assembly including windings selectively energized in at least one preselected sequence, the rotatable assembly being in driving relation to the rotatable component;

a circuit for generating a BEMF signal representative of a back electromotive force (EMF) in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

a control circuit response to the BEMF signal for generating a commutation signal, the control circuit including a commutation counter counting at a rate, the commutation counter increasing its count when the BEMF signal is of the first polarity and decreasing its count when the BEMF signal is of the second polarity, and generating a corresponding commutation signal when the count reaches a commutation delay value, the commutation signal including a series of commutation pulses and the control circuit measuring an interval between commutation pulses;

power switching devices responsive to the commutation signal for selectively connecting a power supply to the windings in the preselected sequence to produce an electromagnetic field for rotating the rotatable assembly;

a speed regulation circuit for comparing the measured interval to a reference interval, the reference interval corresponding to a desired motor speed, and for generating a difference signal between the compared measured interval and the reference interval defining a speed errors, and a processor for integrating the speed error and for generating an integrated speed error signal in response thereto, the processor including a speed error precounter for accumulating the speed error and altering the integrated speed error signal when the speed error accumulates to, an amount selected from a predefined set of values, the speed regulation circuit including a speed regulation counter responsive to the integrated speed error signal and the difference signal for generating a peak current reference signal, and the speed regulation circuit regulating the current in the windings as a function of the peak current reference signal thereby to regulate the speed of the motor.

13. The system of claim 12 wherein a positive speed error represents an underspeed condition and a negative speed error represents an overspeed condition, and wherein the speed regulation counter increases its count at a predetermined rate in response to a positive speed error and decreases its count at the predetermined rate in response to a negative speed error, and further comprising at least two reference interval timers for providing the reference interval during periods when the speed regulation counter is decreasing its count in response to a negative speed error corresponding to a prior measured interval.

14. The system of claim 1 wherein the commutation signal includes a series of commutation pulses and wherein the control circuit measures a commutation interval between consecutive commutation pulses and further comprising a current detector circuit for sensing current in each of the windings and a variable off time circuit for discontinuing for a predetermined period of time power being provided to each of the windings in which the current reaches a peak current reference level for regulating current in the motor, the predetermined period of time selected from a predefined set of values as a function of the measured commutation interval for minimizing losses and for providing smooth torque production.

15. A system for driving a rotatable component comprising:

a motor having a stationary assembly and a rotatable assembly in magnetic coupling relation thereto the stationary assembly including windings adapted to be energized in at least one preselected sequence, the rotatable assembly being in driving relation to the rotatable component;

a circuit for generating a BEMF signal representative of a back electromotive force (EMF in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

a control circuit responsive to the BEMF signal for generating a commutation signal the control circuit including a commutation counter counting at a rate, the commutation counter increasing its count when the BEMF signal is of the first polarity and decreasing its count when the BEMF signal is of the second polarity, and generating a corresponding commutation signal when the count reaches a commutation delay value;

power switching devices responsive to the commutation signal for selectively connecting a power supply to the windings in the preselected sequence to produce an electromagnetic field for rotating the rotatable assembly;

a microcomputer in serial communication with the control circuit: and a microcomputer watchdog circuit for resetting the microcomputer when a data signal from the microcomputer is absent for a predetermined interval of time, the microcomputer watchdog circuit generating a reset signal having a predetermined duration for resetting the microcomputer.

16. A system for driving a rotatable component comprising:

a motor having a stationary assembly and a rotatable assembly in magnetic coupling relation thereto, the stationary assembly including windings selectively energized in at least one preselected sequence, the rotatable assembly being in driving relation to the rotatable component;

a circuit for generating a BEMF signal representative of a back electromotive force (EMF) in the windings, said windings having an inductive current producing a field collapse voltage in advance of the back EMF;

a control circuit responsive to the BEMF signal for generating a commutation signal;

power switching devices responsive to the commutation signal for selectively connecting a power supply to the windings in the preselected sequence to produce an electromagnetic field for rotating the rotatable assembly; and a circuit for inhibiting switching events of the power switching devices in advance of the back EMF during periods when the field collapse voltage is present whereby switching events during field collapse voltage are inhibited when the motor is operating below approximately ½ no load speed.

17. A system for driving a rotatable component comprising:

a motor having a stationary assembly and a rotatable assembly in magnetic coupling relation thereto, the stationary assembly including windings selectively energized in at least one preselected sequence, the rotatable assembly being in driving relation to the rotatable component;

a circuit for generating a BEMF signal representative of a back electromotive force (EMF) in the windings;

a control circuit responsive to the BEMF signal for generating a commutation signal having a series of commutation pulses and for measuring an interval between commutation pulses;

power switching devices responsive to the commutation pulses of the commutation signal for selectively connecting a power supply to the windings in the preselected sequence to produce an electromagnetic field for rotating the rotatable assembly;

a speed regulation circuit for comparing the measured interval to a reference interval, the reference interval corresponding to a desired motor speed, and for generating a difference signal between the compared measured interval and the reference interval defining a speed error;

a processor for integrating the speed error and for generating an integrated speed error signal in response thereto, the processor including a speed error pre-counter for accumulating the speed error and altering the integrated speed error signal when the speed error accumulates to an amount selected from a predefined set of values; and wherein the speed regulation circuit includes a speed regulation counter responsive to the integrated speed error signal and the difference signal for generating a peak current reference signal, and wherein the speed regulation circuit regulates the current in the windings as a function of the peak current reference signal thereby to regulate the speed of the motor.

18. A system for driving a rotatable component comprising:

a motor having a stationary assembly and a rotatable assembly in magnetic coupling relation thereto, the stationary assembly including windings selectively energized in at least one preselected sequence, the rotatable assembly being in driving relation to the rotatable component;

a circuit for generating a BEMF signal representative of a back electromotive force (EMF) in the windings;

a control circuit responsive to the BEMF signal for generating a commutation signal having a series of commutation pulses and for measuring a commutation interval between consecutive commutation pulses;

power switching devices responsive to the commutation pulses of the commutation signal for selectively connecting a power supply to the windings in the preselected sequence to produce an electromagnetic field for rotating the rotatable assembly;

a current detector circuit for sensing current in each of the windings; and a variable off time circuit for discontinuing for a predetermined period of time power being provided to each of the windings in which the current reaches a peak current reference level for regulating current in the motor, the predetermined period of time selected from a predefined set of values as a function of the measured commutation interval for minimizing losses and for providing smooth torque production.

19. A refrigeration system comprising:

a compressor for circulating a refrigerant through an evaporator;

a motor having a stationary assembly and a rotatable assembly in magnetic coupling relation thereto, the stationary assembly including windings selectively energized in at least one preselected sequence, the rotatable assembly being in driving relation to the compressor;

a circuit for generating a BEMF signal representative of a back electromotive force (EMF) in the winding the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

a control circuit responsive to the BEMF signal for generating a commutation signal, the control circuit including a commutation counter counting at a rate, the commutation counter increasing its count when the BEMF signal is of the first polarity and decreasing its count when the BEMF signal is of the second polarity, and generating a corresponding commutation signal when the count reaches a commutation delay value; and power switching devices responsive to the commutation signal for selectively connecting a power supply to the windings in the preselected sequence to produce an electromagnetic field for rotating the rotatable assembly.

20. A motor comprising:

a stationary assembly and a rotatable assembly in magnetic coupling relation thereto, the stationary assembly including windings selectively energized in at least one preselected sequence;

a circuit for generating a BEMF signal representative of a back electromotive force (EMF) in the winding, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

a control circuit responsive to the BEMF signal for generating a commutation signal, the control circuit including a commutation counter counting at a rate, the commutation counter increasing its count when the BEMF signal is of the first polarity and decreasing its count when the BEMF signal is of the second polarity, and generating a corresponding commutation signal when the count reaches a commutation delay value; and power switching devices responsive to the commutation signal for selectively connecting a power supply to the windings in the preselected sequence to produce an electromagnetic field for rotating the rotatable assembly.

21. An application specific integrated circuit (ASIC) for use with a motor having a stationary assembly and a rotatable assembly in magnetic coupling relation thereto, the stationary assembly including windings selectively energized in at least one preselected sequence, the motor further having power switching devices responsive to a commutation signal for selectively connecting a power supply to the windings in the preselected sequence to produce an electromagnetic field for rotating the rotatable assembly, the ASIC comprising:

a circuit for generating a BEMF signal representative of a back electromotive force (EMF) in the winding the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity; and a control circuit responsive to the BEMF signal for generating the commutation signal, the control circuit including a commutation counter counting at a rate, the commutation counter increasing its count when the BEMF signal is of the first polarity and decreasing its count when the BEMF signal is of the second polarity, and generating a corresponding commutation signal when the count reaches a commutation delay value.

22. A method of operating a system for driving a rotatable component, the system comprising a motor having a stationary assembly and a rotatable assembly in magnetic coupling relation thereto, the stationary assembly including windings selectively energized in at least one preselected sequence, the rotatable assembly being in driving relation to the rotatable component, the method comprising:

generating a BEMF signal representative of a back electromotive force (EMF) in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

generating a commutation signal in response to the BEMF signal;

increasing a count of a commutation counter counting at a rate when the BEMF signal is of the first polarity and decreasing the count when the BEMF signal is of the second polarity;

generating a corresponding commutation signal when the count reaches a commutation delay value; and selectively connecting a power supply to the windings in the preselected sequence by switching power switching devices in response to the commutation signal to produce an electromagnetic field for rotating the rotatable assembly.

23. The method of claim 22 further comprising the step of generating the corresponding commutation signal a predetermined commutation delay angle after a corresponding zero crossing and wherein the commutation value corresponds to the commutation delay angle.

24. The method of claim 23 wherein the commutation signal includes a series of commutation pulses and further comprising the step of measuring a commutation interval between consecutive commutation pulses as a function of the count and wherein the commutation delay value is a function of the count corresponding to a prior commutation interval.

25. The method of claim 24 further comprising the step of defining the commutation delay value to be a binary fraction of the count corresponding to the prior commutation interval thereby defining the commutation delay angle.

26. The method of claim 23 further comprising the step of selecting the rate at which the commutation counter counts from a predefined set of frequencies thereby selecting the commutation delay angle.

27. The method of claim 26 wherein inductive current in the windings produces a field collapse voltage in advance of the back EMF and further comprising the steps of inhibiting the commutation counter from increasing its count and only permitting the commutation counter to decrease its count during periods following the commutation signal when the field collapse voltage is present and wherein the commutation counter decreases its count at a rate greater than the commutation counter increases its count.

28. The method of claim 27 wherein the step of inhibiting the commutation counter from increasing its count includes the step of inhibiting the commutation counter from increasing its count when the commutation delay value is less than the count corresponding to the prior commutation interval.

29. The method of claim 22 wherein inductive current in the windings produces a field collapse voltage in advance of the back EMF and further comprising the step of inhibiting switching events of the power switching devices in advance of the back EMF during periods when the field collapse voltage is present whereby switching events during field collapse voltage are inhibited when the motor is operating below approximately ½ no load speed.

30. The method of claim 29 further comprising the step of selecting and pulse width modulating one of the power switching devices to control the rate of current decay in the windings.

31. The method of claim 22 wherein the rotatable component is a compressor which circulates refrigerant through an evaporator and further comprising the step of heating the refrigerant before the rotatable assembly is rotated by generating the commutation signal so that the commutation signal has a commutation rate corresponding to a motor speed exceeding that at which inertia of the rotatable assembly permits rotation whereby current in the windings heats the windings thereby heating the refrigerant of the compressor.

32. The method of claim 31 further comprising the step of selecting the commutation rate from a predefined set of commutation rates for reducing noise in the motor.

33. The method of claim 22 wherein the commutation signal includes a series of commutation pulses and further comprising the steps of measuring an interval between commutation pulses and comparing the measured interval to a reference interval, the reference interval corresponding to a desired motor speed, and generating a difference signal between the compared measured interval and the reference interval defining a speed error, and further comprising the steps of integrating the speed error and generating an integrated speed error signal in response thereto, accumulating the speed error by a processor having a speed error pre-counter and altering the integrated speed error signal when the speed error accumulates to an amount selected from a predefined set of values, and further comprising the step of generating a peak current reference signal responsive to the integrated speed error signal and the difference signal, and wherein the current in the windings is regulated as a function of the peak current reference signal thereby to regulate the speed of the motor.

34. The method of claim 33 wherein a positive speed error represents an underspeed condition and a negative speed error represents an overspeed condition, and further comprising the steps of increasing a count of a speed regulation counter at a predetermined rate in response to an underspeed condition and decreasing the count at the predetermined rate in response to an overspeed condition, and further comprising the step of providing the reference interval from at least two reference interval timers during periods when the speed regulation counter is decreasing its count in response to an overspeed condition corresponding to a prior measured interval.

35. The method of claim 33 further comprising the step of resetting the processor when a data signal from the processor is absent for a predetermined interval of time by generating a reset signal having a predetermined duration for resetting the processor.

36. The method of claim 22 wherein the commutation signal includes a series of commutation pulses and further comprising the steps of measuring a comutation interval between consecutive commutation pulses, sensing current in each of the windings and discontinuing for a predetermined period of time power being provided to each of the windings in which the current reaches a peak current reference level to regulate current in the motor, the predetermined period of time selected from a predefined set of values as a function of the measured commutation interval for minimizing losses and for providing smooth torque production.

37. A method of operating a system for driving a rotatable component, the system comprising a motor having a stationary assembly and a rotatable assembly in magnetic coupling relation thereto, the stationary assembly including windings selectively energized in at least one preselected sequence, the rotatable assembly being in driving relation to the rotatable component, the method comprising:

generating a BEMF signal representative of a back electromotive force (EMF) in the windings, said windings having an inductive current producing a field collapse voltage in advance of the back EMF;

generating a commutation signal in response to the BEMF signal;

selectively connecting a power supply to the windings in the preselected sequence by switching power switching devices in response to the commutation signal to produce an electromagnetic field for rotating the rotatable assembly; and inhibiting switching events of the power switching devices in advance of the back EMF during periods when the field collapse voltage is present whereby switching events during field collapse voltage are inhibited when the motor is operating below approximately ½ no load speed.

38. A method of operating a system for driving a rotatable component, the system comprising a motor having a stationary assembly and a rotatable assembly in magnetic coupling relation thereto, the stationary assembly including windings selectively energized in at least one preselected sequence, the rotatable assembly being in driving relation to the rotatable component, the method comprising:

generating a BEMF signal representative of a back electromotive force (EMF) in the windings;

generating a commutation signal in response to the BEMF signal, the commutation signal including a series of commutation pulses;

measuring an interval between commutation pulses;

selectively connecting a power supply to the windings in the preselected sequence by switching power switching devices in response to the commutation signal to produce an electromagnetic field for rotating the rotatable assembly;

comparing the measured interval to a reference interval, the reference interval corresponding to a desired motor speed;

generating a difference signal between the compared measured interval and the reference interval defining a speed error;

integrating the speed error and generating an integrated speed error signal in response thereto;

accumulating the speed error;

altering the integrated speed error signal when the speed error accumulates to an amount selected from a predefined set of values; and generating a peak current reference signal responsive to the integrated speed error signal and the difference signal, and wherein the current in the windings is regulated as a function of the peak current reference signal thereby to regulate the speed of the motor.

39. A method of operating a system for driving a rotatable component, the system comprising a motor having a stationary assembly and a rotatable assembly in magnetic coupling relation thereto, the stationary assembly including windings selectively energized in at least one preselected sequence, the rotatable assembly being in driving relation to the rotatable component, the method comprising:

generating a BEMF signal representative of a back electromotive force (EMF) in the windings;

generating a commutation signal in response to the BEMF signal, the commutation signal including a series of commutation pulses;

measuring a commutation interval between consecutive commutation pulses;

selectively connecting a power supply to the windings in the preselected sequence by switching power switching devices in response to the commutation signal to produce an electromagnetic field for rotating the rotatable assembly;

sensing current in each of the windings; and discontinuing for a predetermined period of time power being provided to each of the windings in which the current reaches a peak current reference level to regulate current in the motor, the predetermined period of time selected from a predefined set of values as a function of the measured commutation interval for minimizing losses and for providing smooth torque production.

40. A method of operating a refrigeration system having a compressor for circulating a refrigerant through an evaporator and a motor for driving the compressor, the motor having a stationary assembly and a rotatable assembly in magnetic coupling relation thereto, the stationary assembly including windings selectively energized in at least one preselected sequence, the rotatable assembly being in driving relation to the compressor, the method comprising:

generating a BEMF signal representative of a back electromotive force (EMF) in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

generating a commutation signal in response to the BEMF signal;

increasing a count of a conmutation counter counting at a rate when the BEMF signal is of the first polarity and decreasing the count when the BEMF signal is of the second polarity;

generating a corresponding commutation signal when the count reaches a commutation delay value; and selectively connecting a power supply to the windings in the preselected sequence by switching power switching devices in response to the commutation signal to produce an electromagnetic field for rotating the rotatable assembly.

41. A method of operating a motor having a stationary assembly and a rotatable assembly in magnetic coupling relation thereto, the stationary assembly including windings selectively energized in at least one preselected sequence, the method comprising:

generating a BEMF signal representative of a back electromotive force (EMF) in the windings, the BEMF signal having first and second polarities representative of position of the rotatable assembly relative to a zero crossing of the back EMF, the first polarity being representative of the position of the rotatable assembly past a position corresponding to the zero crossing and the second polarity being opposite the first polarity;

generating a commutation signal in response to the BEMF signal;

increasing a count of a commutation counter counting at a rate when the BEMF signal is of the first polarity and decreasing the count when the BEMF signal is of the second polarity;

generating a corresponding commutation signal when the count reaches a commutation delay value; and selectively connecting a power supply to the windings in the preselected sequence by switching power switching devices in response to the commutation signal to produce an electromagnetic field for rotating the rotatable assembly.

42. A method of operating a refrigeration system having a compressor for circulating a refrigerant through an evaporator and a motor for driving the compressor, the motor having a stationary assembly and a rotatable assembly in magnetic coupling relation thereto, the stationary assembly including windings selectively energized in at least one preselected sequence during operation of the compressor, the rotatable assembly being in driving relation to the compressor, said system including a refrigerant that is in a gaseous state during compressor operation and that may be in a liquid state during periods when the compressor is not being operated, the method comprising:

generating a BEMF signal representative of a back electromotive force (EMF) in the windings with a back EMF circuit;

disabling the back EMF circuit and generating a sump heat signal;

generating first and second commutation signals in response to the sump heat signal and the BEMF signal, respectively, the first commutation signal having a commutation rate corresponding to a motor speed exceeding that at which inertia of the rotatable assembly permits rotation; and supplying electrical energy to at least part of the motor windings in response to the first commutation signal so that heat is generated within such part of the motor windings and so that the rotatable assembly is not caused to commence rotation for a period of time sufficient to cause liquid refrigerant in the compressor to change state to a gaseous state; and thereafter supplying electrical energy to the motor windings in the preselected sequence in response to the second commutation signal thereby causing the rotatable assembly to commence rotation with respect to the stationary assembly.

43. A refrigeration system comprising:

a compressor for circulating a refrigerant through an evaporator;

a motor having a stationary assembly and a rotatable assembly in magnetic coupling relation thereto, the stationary assembly including windings selectively energized in at least one preselected sequence during operation of the compressor, the rotatable assembly being in driving relation to the compressor;

a refrigerant that is in a gaseous state during compressor operation and that may be in a liquid state during periods when the compressor is not being operated;

a circuit for generating a BEMF signal representative of a back electromotive force (EMF) in the windings;

a sump heat circuit for disabling the back EMF circuit and for generating a sump heat signal;

a control circuit responsive to the sump heat signal for generating a first commutation signal and responsive to the BEMF signal for generating a second commutation signals the first commutation having a commutation rate corresponding to a motor speed exceeding that at which inertia of the rotatable assembly permits rotation; and power switching devices responsive to the first commutation signal for selectively connecting a power supply to at least part of the motor windings in a manner that causes heat to be generated within such part of the motor windings and that does not cause the rotatable assembly to commence rotation for a period of time sufficient to cause liquid refrigerant in the compressor to change state to a gaseous state and thereafter responsive to the second commutation signal for selectively connecting the power supply to the motor windings in the preselected sequence and thereby causing the rotatable assembly to commence rotation with respect to the stationary assembly.

* * * * *

UNITED STATES PATENT AND TRADEMARK OFFICE
CERTIFICATE OF CORRECTION

PATENT NO. : 5,506,487
DATED : April 9, 1996
INVENTOR(S) : Glen C. Young et al.

It is certified that error appears in the above-indentified patent and that said Letters Patent is hereby corrected as shown below:

On the cover page of the issued patent, under Related U.S. Application Data, "March 28, 1991" should read ---March 28, 1994---.

Column 6, line 61, "bASIC" should read ---ASIC---.

Column 12, line 1, "$2\alpha = 16$" should read ---$2^4=16$---.

Column 13, line 51, "IC 104" should read ---ASIC 104---.

Column 15, line 42, "lidid" should read ---liquid---.

Column 20, line 28, "COFIREF" should read ---COMREF---.

Column 24, claim 12, lines 13-14, "a speed errors, and" should read ---a speed error; and---.

Column 27, claim 21, line 56, "the winding the" should read ---the windings, the---.

Column 31, claim 40, line 46, "conmutation" should read ---commutation---.

UNITED STATES PATENT AND TRADEMARK OFFICE
CERTIFICATE OF CORRECTION

PATENT NO.  :   5,506,487
DATED       :   April 9, 1996
INVENTOR(S) :   Glen C. Young, et al It is certified that error appears in the above-indentified patent and that said Letters Patent is hereby corrected as shown below:

Column 33, claim 43, line 6, "signals the" should read -- signal, the--.

Signed and Sealed this

Sixteenth Day of September, 1997

Attest:

BRUCE LEHMAN

*Attesting Officer*              *Commissioner of Patents and Trademarks*